United States Patent [19]

Shogo et al.

[11] 4,114,014

[45] Sep. 12, 1978

[54] PROCESS AND APPARATUS FOR PRODUCING A WIRE-HARNESS

[75] Inventors: Iizuka Shogo; Endo Mitsuo, both of Gotenba; Watanabe Mitsugu; Iizuka Toshio, both of Numazu; Usui Kenji, Gotenba, all of Japan

[73] Assignee: Yazaki Corporation, Tokyo, Japan

[21] Appl. No.: 737,025

[22] Filed: Oct. 29, 1976

[30] Foreign Application Priority Data

Oct. 30, 1975 [JP] Japan ............................... 50-129829
Mar. 24, 1976 [JP] Japan ............................... 51-031404

[51] Int. Cl.$^2$ ............................................ B23K 11/00

[52] U.S. Cl. .................................... 219/56; 29/564.4; 29/564.6; 219/58; 228/4.5; 228/904; 219/85 G

[58] Field of Search .................... 29/564.4, 564.6, 628, 29/630 A, 704, 714, 715; 219/56, 58, 85 G, 86, 87, 118, 119; 228/4.5, 173 E, 904

[56] References Cited

U.S. PATENT DOCUMENTS

| | | | |
|---|---|---|---|
| 3,016,448 | 1/1962 | Bach et al. | 219/56 X |
| 3,032,860 | 5/1962 | Andren | 29/628 X |
| 3,368,059 | 2/1968 | Scott et al. | 219/118 |
| 3,418,712 | 12/1968 | Scherb, Jr. | 29/628 X |
| 3,505,720 | 4/1970 | Heimbrock | 29/564.4 |
| 3,668,615 | 6/1972 | Bury | 29/630 A X |
| 3,800,389 | 4/1974 | Brehm et al. | 29/704 X |

*Primary Examiner*—E. A. Goldberg

*Attorney, Agent, or Firm*—Jacobi, Lilling & Siegel

[57] ABSTRACT

This invention provides a process for producing a wire-harness, in which by arranging connectors having exposed connection ends on a working stand at intervals corresponding to intervals in the product, holding these connection ends on one of welding electrodes, cutting in succession wires on a reel station in prescribed lengths and removing an insulating coating from the cut ends of the wires by an NC tape-controlled automatic wire-cutting and coating-removing device, overlapping the cut ends of the wires on the connection ends of respective elements of the connector by a wire-laying head, and moving the other electrode downwardly to the above-mentioned one electrode to weld the cut ends of the wires to the connection ends of the connector elements in the overlapped state, all the production operations including the operation of connecting wires to connectors being performed substantially automatically. For attaining this automation, a plurality of sets of wire clamping members and lower welding electrodes are disposed closely to each other and are arranged so that when a wire is laid out between the clamping members by the wire-laying head operated automatically, the exposed end of the wire is located on the lower welding electrode and overlapped on the connection end of the connector already located on the lower welding electrode, and the exposed end of the wire is welded to the connection end of the connector in this overlapped state.

18 Claims, 34 Drawing Figures

FIG. I
1
2
3
4
5
6
7
8
9

FIG. 21
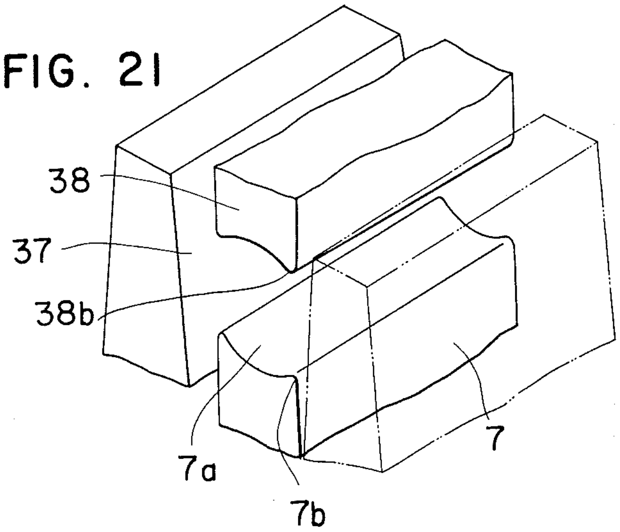
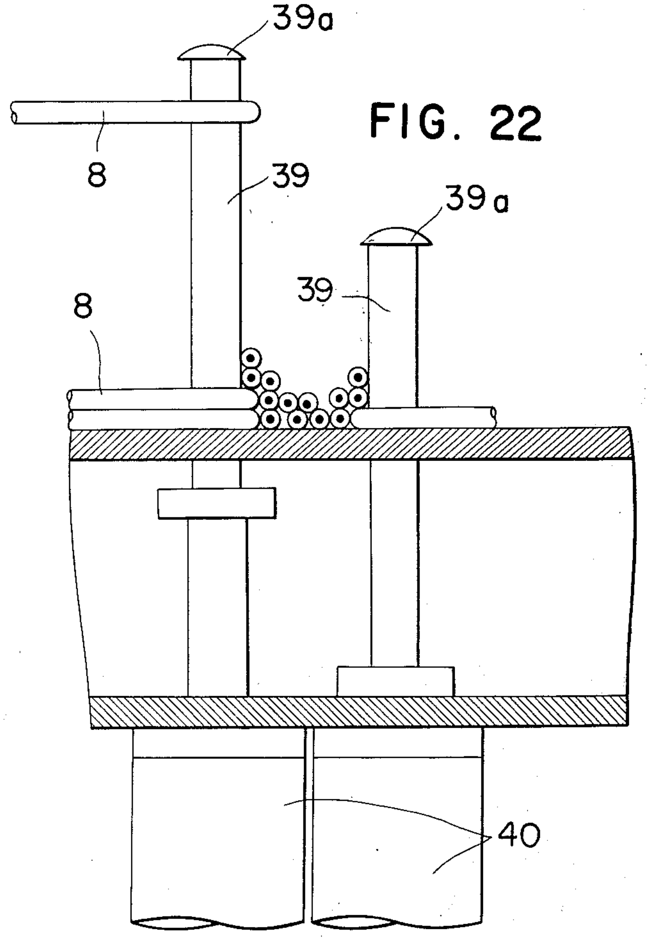
FIG. 22

PROCESS AND APPARATUS FOR PRODUCING A WIRE-HARNESS

This invention relates to a process and apparatus for producing a wire-harness.

BACKGROUND OF THE INVENTION

A wire-harness includes a number of branched wires for a number of electric equipments, which extend in the axial direction parallel to the length of an automobile to which the harness is attached. A connector is disposed on the end portion of each branched wire to connect it to the corresponding equipment.

According to the conventional process for producing a wire-harness, wires having a specific color for discrimination of the corresponding circuit are cut in advance, terminal fittings are connected to the cut ends of the wires, and these terminal fittings are inserted into connectors at branching or terminal points to form trunk and branch portions. These trunk and branch portions are gathered and fixed by an adhesive tape or the like. In this conventional process, all the operations for assembling a wire-harness are manually performed, and hence, the productivity is very low and the manufacturing rate is extremely low.

SUMMARY OF THE INVENTION

The present invention has now been completed as a result of our research work with an attempt to develop a process for producing a wire-harness in which an automatic wire-laying technique is adopted and the inefficiency involved in the conventional process is remarkably moderated.

It is therefore a primary object of the present invention to provide a process in producing a wire-harness in which in laying out wires automatically, exposed ends of wires are overlapped on connection ends of the respective elements of a connector disposed on a lower welding electrode, and the exposed ends are welded to the connection ends in this overlapped state, whereby all the production operations including the operation of connecting wires to the connectors can be automatically performed. This way, the complicated operations involved in the conventional process for the production of a wire-harness can be remarkably simplified.

Another object of the present invention is to provide a process for producing a wire-harness in which a wire is connected to a terminal fitting of a connector, a terminal end of a laying wire is overlapped on the exposed end of said wire on a welding electrode, and the overlapped portion is welded after completion of laying-out, whereby all the production operations including the operation of connecting wires to the connectors can be automatically performed, and in which by connecting the laying wire to the connector through the wire connected in advance to the connector by welding, complicated assembling operations heretofore conducted after the welding step can be omitted.

Still another object of the present invention is to provide a process for producing a wire-harness in which the laying end of a laying wire is overlapped on a terminal fitting of a connector on a welding electrode, the laying end of the wire is welded in the overlapped state to the terminal fitting of the connector after completion of laying-out, and the terminal fitting is inserted into a connector housing, whereby connectors can easily be assembled.

Still another object of the present invention is to provide a process for producing a wire-harness in which the laying end of a laying wire is overlapped on a terminal fitting inserted in a connector housing on a welding electrode, and the overlapping portion is welded after completion of laying-out to form a covering member on the connector housing, whereby connectors can easily be assembled.

Still another object of the present invention is to provide a process for producing a wire harness in which a wire having a specific color for discrimination is connected in advance to a terminal fitting of a connector, the laying end of a non-colored common wire is overlapped on the exposed end of said wire having a specific color on a welding electrode, and the overlapped portion is welded after completion of laying-out whereby all the production operations including the operation of connecting wires to the connectors can be automatically performed, and in which circuits can easily be discriminated because of wires of a specific color connected to the terminal fittings of the respective connectors, and the common laying wire can be supplied from one reel.

Still another object of the present invention is to provide a process for producing a wire-harness in which a wire having a specific color for discrimination is connected in advance to a terminal fitting of a connector. The laying end of a wire of the same color is overlapped on the exposed end of said colored wire connect to the terminal fitting on a welding electrode, and the overlapped portion is welded after completion of laying-out. In this way, all the production operations including the operation of connecting wires to connectors can be automatically performed, and circuits can easily be discriminated, since the wires have a specific color for discrimination, making mis-wiring easily identificable.

Still another object of the present invention is to provide a process for producing a wire-harness in which a copper wire is connected in advance to a terminal fitting of a connector. The laying end of an aluminum wire is overlapped on the exposed end of the copper wire on a welding electrode, and the overlapped portion is welded after completion of laying-out. This way, a certain strength is maintained at the wire-terminal fitting connecting portion, corrosion of the terminal portion often caused by the difference of ionization tendency when an aluminum wire is directly connected to a terminal fitting composed of brass or the like can be conveniently avoided, and the entire weight of a wire-harness can be reduced because an aluminum wire is used for the majority of intermediate wiring.

Still another object of the present invention is to provide a process for producing a wire-harness in which a wire having a relatively large diameter is connected in advance to a terminal fitting of a connector. The laying end of a wire having a relatively small diameter is overlapped on the exposed portion of the wire having a relatively large diameter on a welding electrode, and the overlapped portion is welded after completion of laying-out. In this way, the connection and clamping of the laying wire to a U-shaped pressing portion of the terminal fitting is easily accomplished through the wire having a relatively large diameter, and the entire diameter of gathered wires in the wire-harness can be remarkably reduced to facilitate assembling of the wire-harness in the limited space of an automobile.

Still another object of the present invention is to provide a process for producing a wire-harness in which a laying pin having a wire pressing head is vertically and movably disposed in a portion of wires branched from a main wire. The wires in this portion are gathered and arranged by this laying pin, and after branching out, rising wires are pressed down by the head of the pin when it moves downwardly, whereby keeping the wires regularly arranged in the branched portion.

Still another object of the present invention is to provide a process for producing a wire-harness in which a connector is disposed in advance on a movable working stand so that the exposed connecting end thereof is located on a lower electrode for welding. In a wire laying stand a laying wire is laid out so that the laying end thereof is overlapped on the connecting end of the connector, and the working stand is moved to a welded stand whose overlapped portion is welded. This way, all the production operations including the operation of connecting wires to connectors can be automatically performed, and the manufacturing efficiency is remarkably enhanced.

Still another object of the present invention is to provide an apparatus for producing a wire-harness in which a plurality of sets of lower welding electrodes and wire clamping members are disposed on a working stand so that when a wire is laid out between the clamping members by a wire-laying head operated automatically, the exposed end of the wire is located on the lower welding electrode and overlapped on the connection end of a connector already located on the lower welding electrode, and in this overlapped state the exposed end of the wire is welded to the connection end of the connector, whereby allowing all the production operations, including the operation of connecting wires to connectors to be performed substantially automatically and mechanically.

Still another object of the present invention is to provide an apparatus for producing a wire-harness which comprises a wire clamping member constructed so that in the automatic laying-out of a wire, the terminal portion of the wire pressed into said clamping member is clamped and supported to locate the exposed end of the wire on a lower welding electrode, and so that when a plurality of wires are pressed into said clamping member, the clamping and supporting force of said clamping member is not dispersed or weakened.

Still another object of the present invention is to provide an apparatus for producing a wire-harness in which a ceramic material is used as a guide for an upper welding electrode which is mounted on a lower welding electrode to prevent entanglement of wires at the welding step, whereby lack of heat generation at the welding step is effectively prevented, and in which an arc-like concave portion is formed on each of the upper and lower electrodes to extend in the axial direction thereof. An arc-like corner portion is also formed on the end of said axial direction to round the section of the welded part of the wire and prevent formation of steps at the welded part of the wire, whereby preventing as much as possible the breakdown of the wire from the welded part.

Still another object of the present invention is to provide an apparatus for producing a wire-harness in which the above-mentioned welding guide composed of a ceramic material is raised with an inclination angle of 4° to 5°, whereby facilitating the withdrawal of the welded wire and preventing the break-down of the ceramic material by the upper welding electrode.

Still another object of the present invention is to provide an apparatus for producing a wire-harness in which a laying wire is cut into a length slightly longer than the prescribed length. The excessive length is confirmed by the moving distance of a wire-laying head, and the rear end of the cut wire is clamped by the wire-laying head and the wire-laying head is retreated by a distance corresponding to said excessive length, whereby preventing the shortening caused by the detouring of the laying wire outside other wire. Hence, unsatisfactory wiring by the length shortage is effectively prevented.

Essentially, according to the present invention, there is provided a process and apparatus for producing a wire-harness comprising arranging connectors on a working stand at intervals corresponding to intervals in the product, holding connection ends of respective connector elements of each connector on one of welding electrodes, cutting laying wires into prescribed lengths in succession and removing an insulating coating from cut ends of the respective wires by an automatic wire-cutting and coating-removing device, overlapping said exposed cut ends of the laying wires on the connection ends of the connector, bringing down the other welding electrode to said one welding electrode and welding the connection ends of the connector elements and the exposed cut ends of the laying wires in the overlapped state.

BRIEF DESCRIPTION OF THE DRAWINGS

The foregoing and other objects, features, and advantages of the present invention will be apparent to those skilled in the art by the following description made with in reference to the accompanying drawings, in which:

FIG. 21 is a perspective view of a welding electrode shown in FIGS. 19 and 20, FIG. 22 is a detailed view of a branching pin for branching wires.

DETAILED DESCRIPTION OF THE PREFERRED EMBODIMENTS

The present invention will now be described with reference to the embodiments illustrated in the accompanying drawings.

Figure 1:
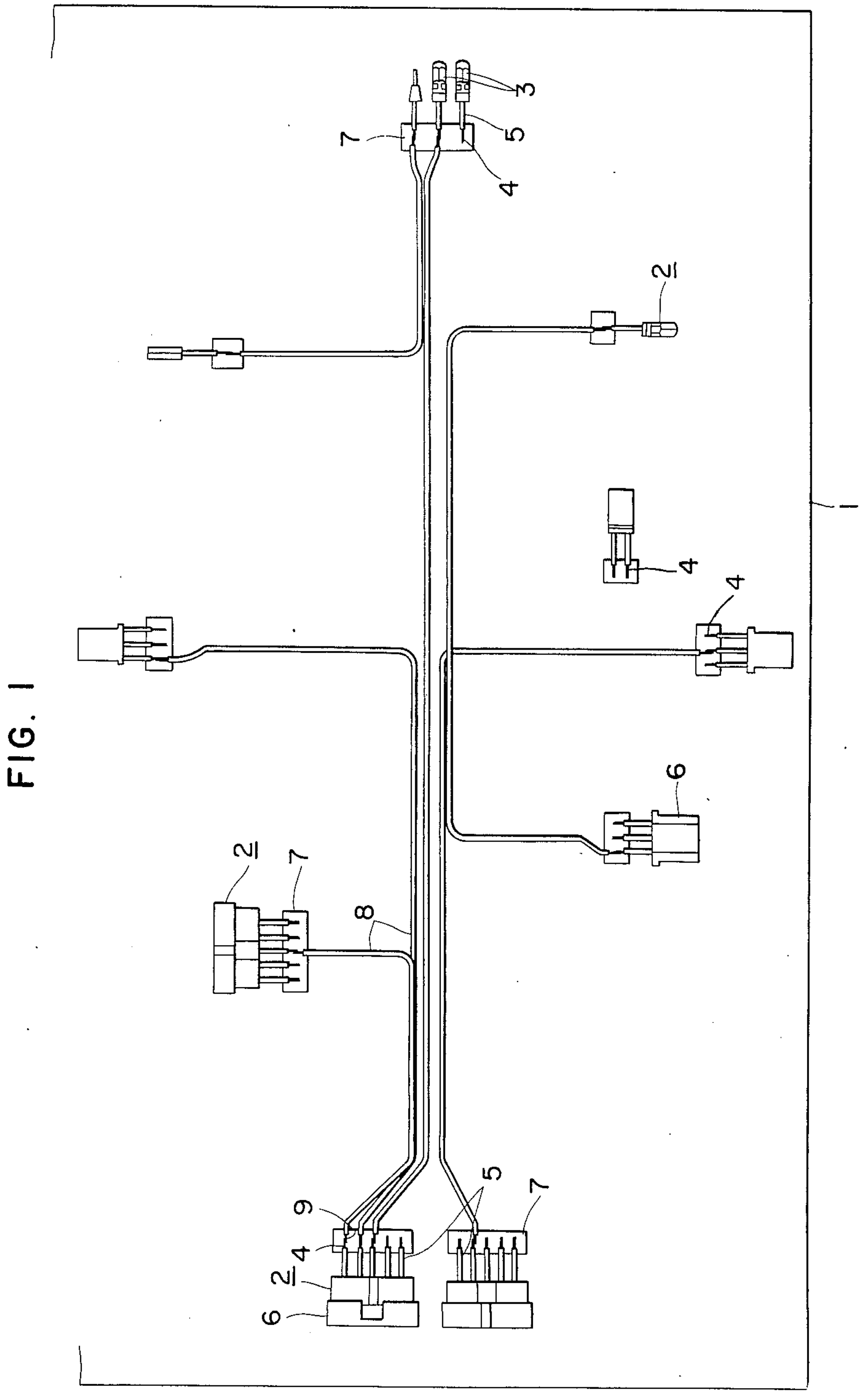
FIGS. 1 to 7 are diagrams showing the processes for producing a wire-harness embodying the present invention.

Referring now to FIG. 1, connectors 2 are disposed in advance at prescribed positions on a working stand 1, and these connectors 2 may comprise a single connector element or a plurality of connector elements. In the embodiment illustrated in FIG. 1, each connector 2 includes terminal fittings 3 composed of brass or the like, and lead wires 5 having exposed ends 4 are previously connected to the terminal fittings 3. The exposed ends 4 of the lead wires 5 of the connector 2 are regularly arranged on a lower welding electrode 7. A laying wire 8 is cut in succession into prescribed lengths by a programmed automatic machine, and an insulating coating on the cutting end is removed to expose a conductor. The thus exposed end 9 of the wire 8 is overlapped on the exposed end 4 of the lead wire 5 of the connector 2 by means of a wire-laying head described hereinafter.

Figure 2:
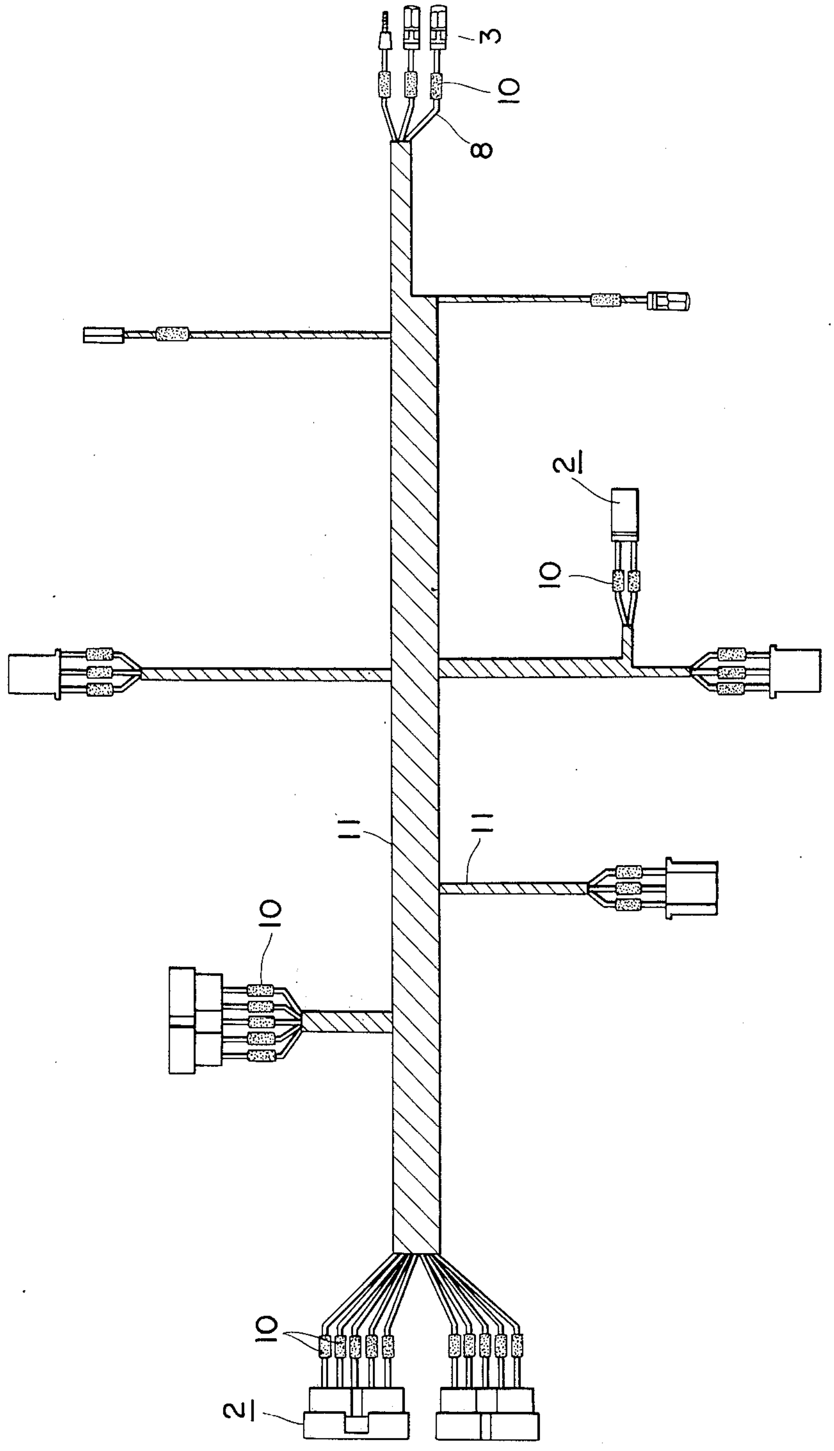

When laying-out is completed, an upper welding electrode is brought down to weld the overlapped exposed ends 4 and 9 on the lower electrode 7. Then, a coating 10 is formed on the welded portion by a separate molding apparatus, and gathering adhesive tapes 11 are applied as shown in FIG. 2 to form a wire-harness.

In the above embodiment, if wires having a specific color for discrimination are used as the lead wires 5, and an uncolored wire is used as the common wire 8, discrimination of respective circuits can be remarkably facilitated, and good results are obtained even if only one reel is provided for such uncolored common wires 8.

Further, in the above embodiment, when wires having a specific color for discrimination are used as lead wires 5, and corresponding colored wires are used as the common wires 8, discrimination of circuits can be remarkably facilitated and mis-wiring is found easily.

Still further, in the above embodiment, when a copper wire is used as the lead wire 5, and an aluminum wire is used as the common wire 8, a certain strength can be maintained at the wire-terminal fitting connecting portion, the corrosion of the terminal portion often caused by the difference of ionization tendency when an aluminum wire is directly connected to a terminal fitting of brass or the like cab be conveniently prevented, and the entire weight of the wire-harness can be reduced because an aluminum wire is used for the majority of the intermediate wiring.

Still in addition, in the above embodiment, when a wire having a relatively large diameter is used as the lead wire 5, and a wire having a relatively small diameter is used as the common wire 8, connection and clamping of the common wire to the U-shaped pressing portion of the terminal fitting can easily be accomplished through the lead wire having a relatively large diameter, and the entire diameter of the gathered wire in the wire-harness can be remarkably reduced to facilitate assembling of the wire-harness in a limited space of an automobile.

Figure 3:
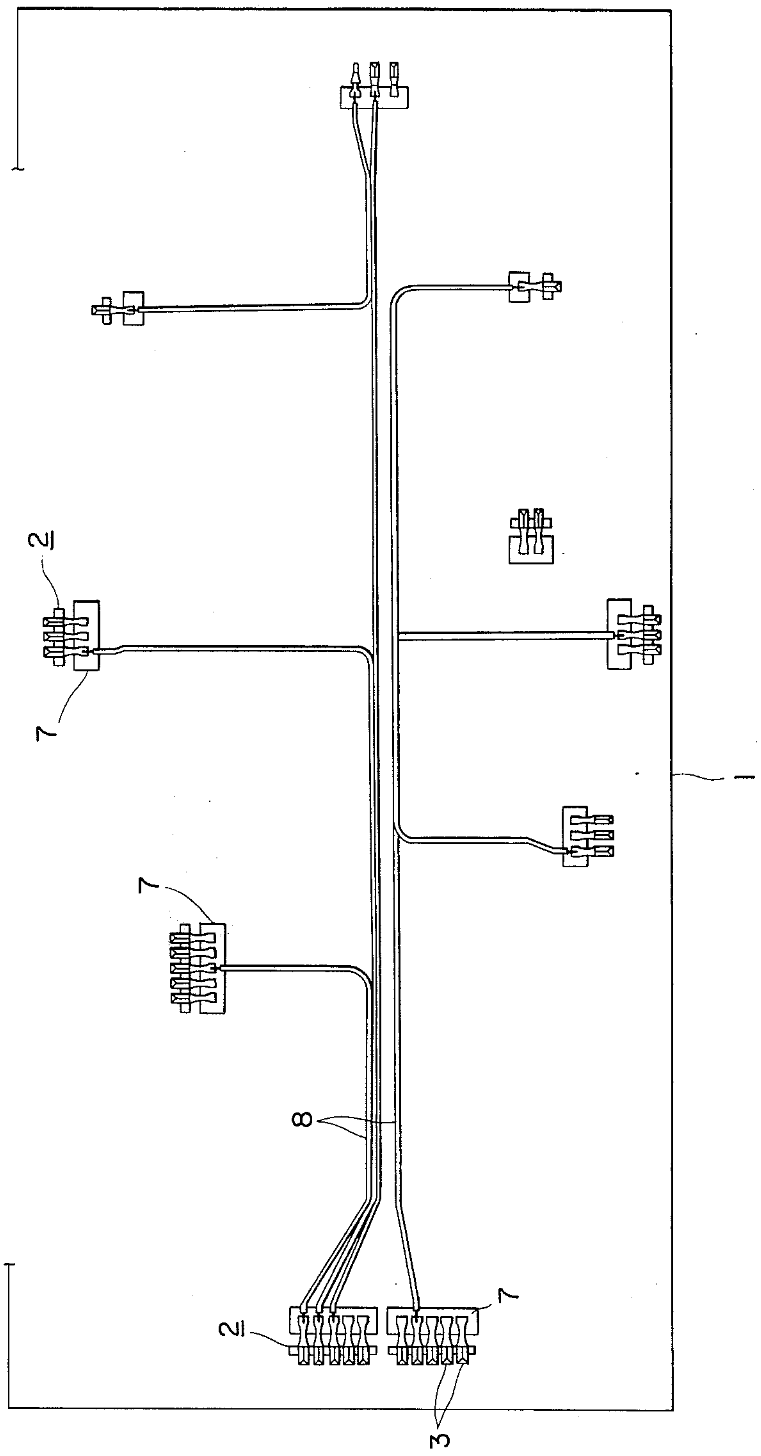
Figure 4:
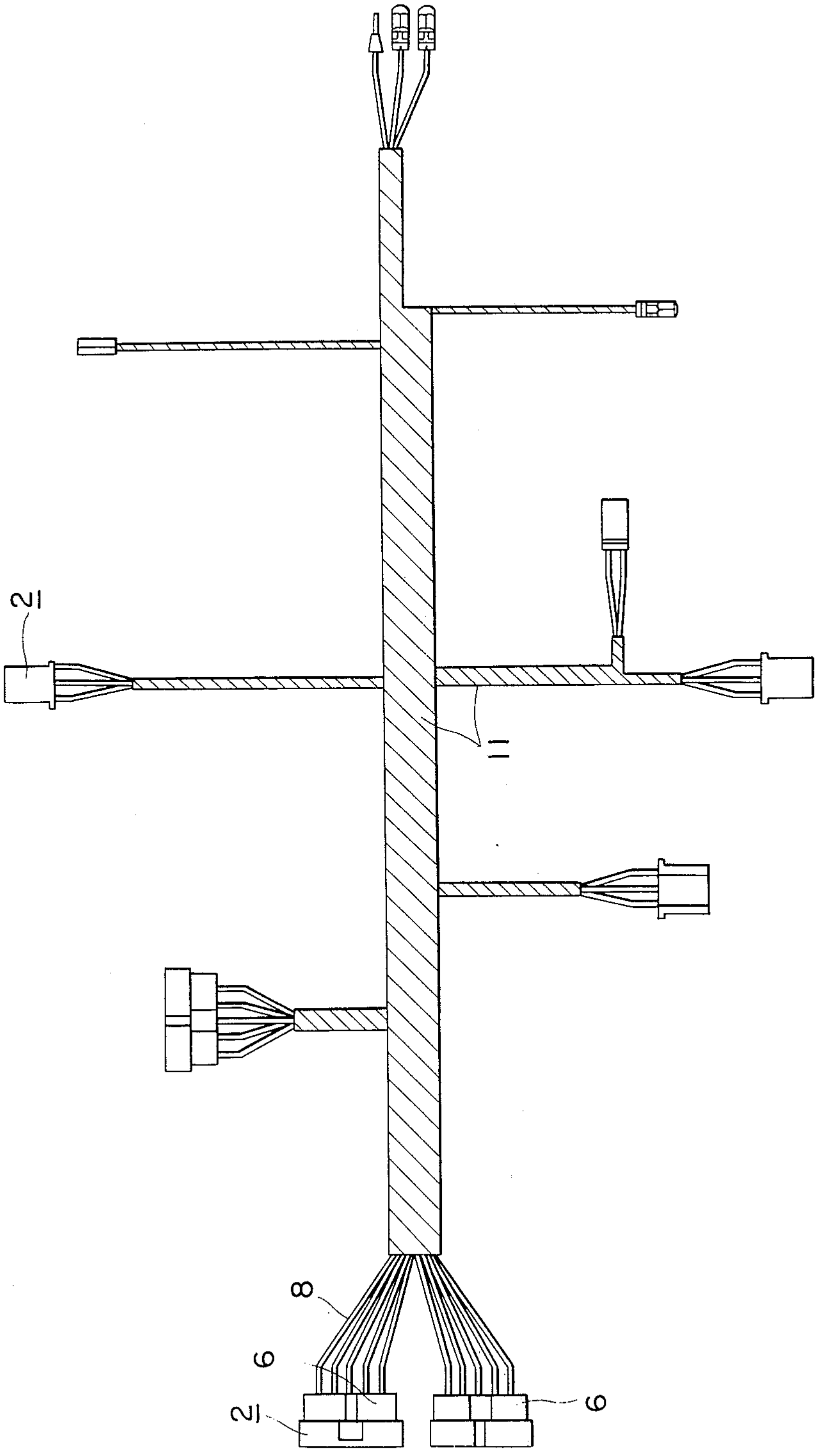

In an embodiment illustrated in FIG. 3, a connector 2 comprises terminal fitting 3 as connector elements, and these fittings 3 are held directly on a lower welding electrode 7, and exposed ends 9 of laying wires 8 are overlapped on and connected to the connection ends of the terminal fittings 3, respectively. When laying-out is completed, the overlapped portions are welded in the same manner as in the above-mentioned embodiment, gathering adhesive tapes 11 are applied as shown in FIG. 4, and terminal fittings 3 are inserted and fixed in a connector housing 6. Thus, production of a wire-harness is completed.

Figure 5:
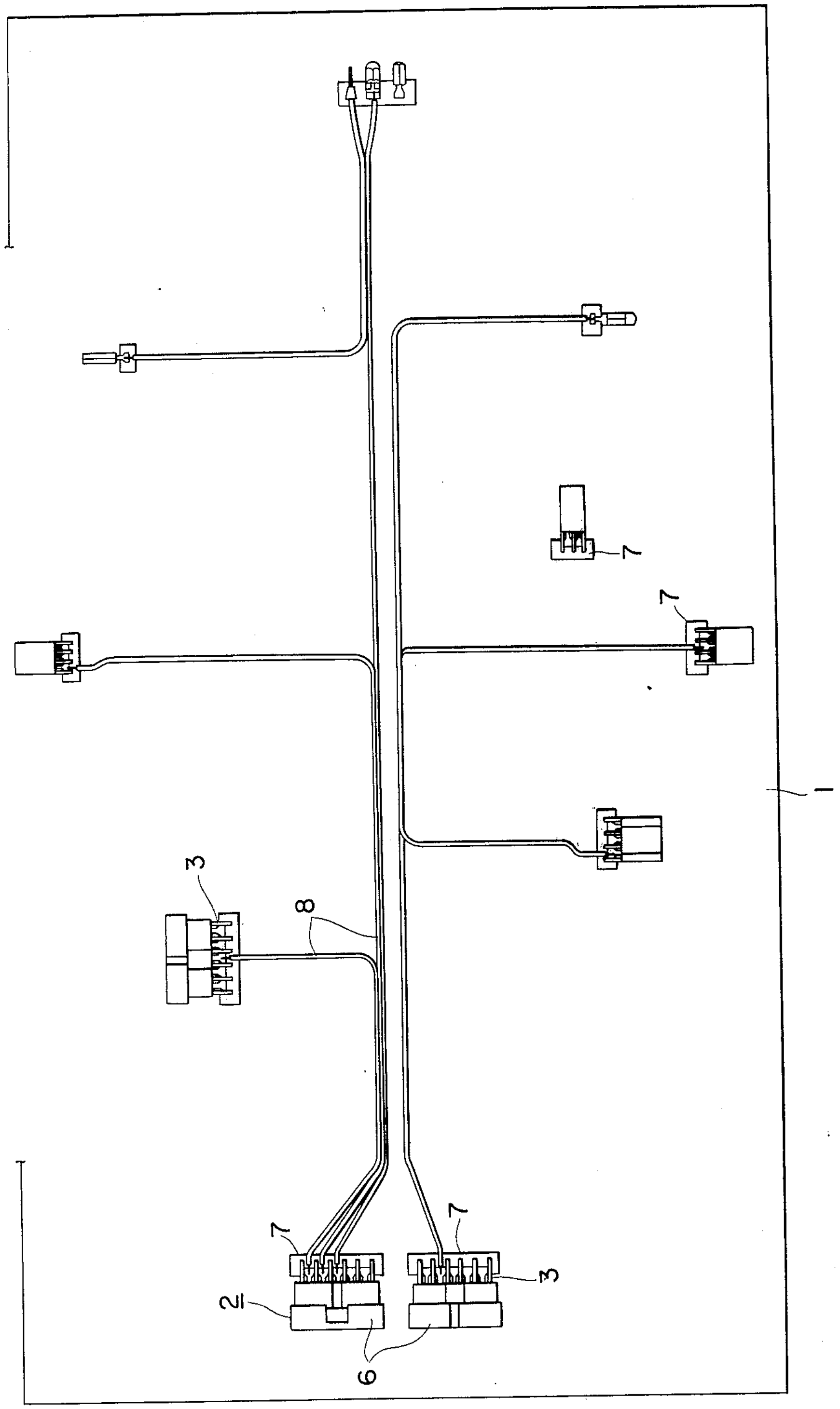
Figure 6:
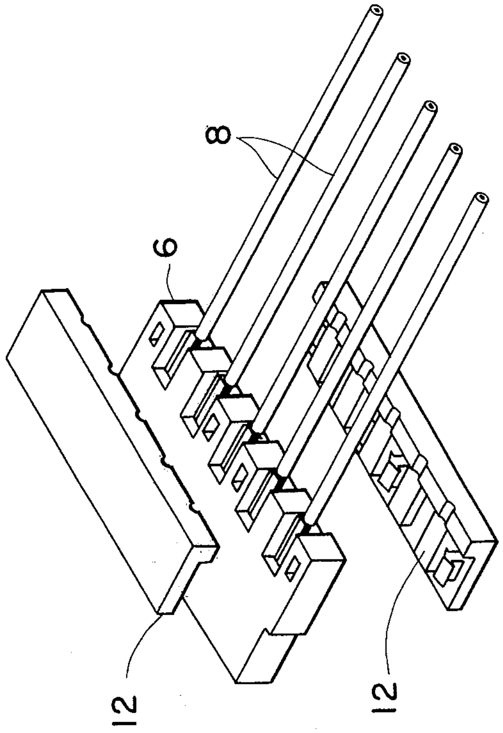
Figure 7:
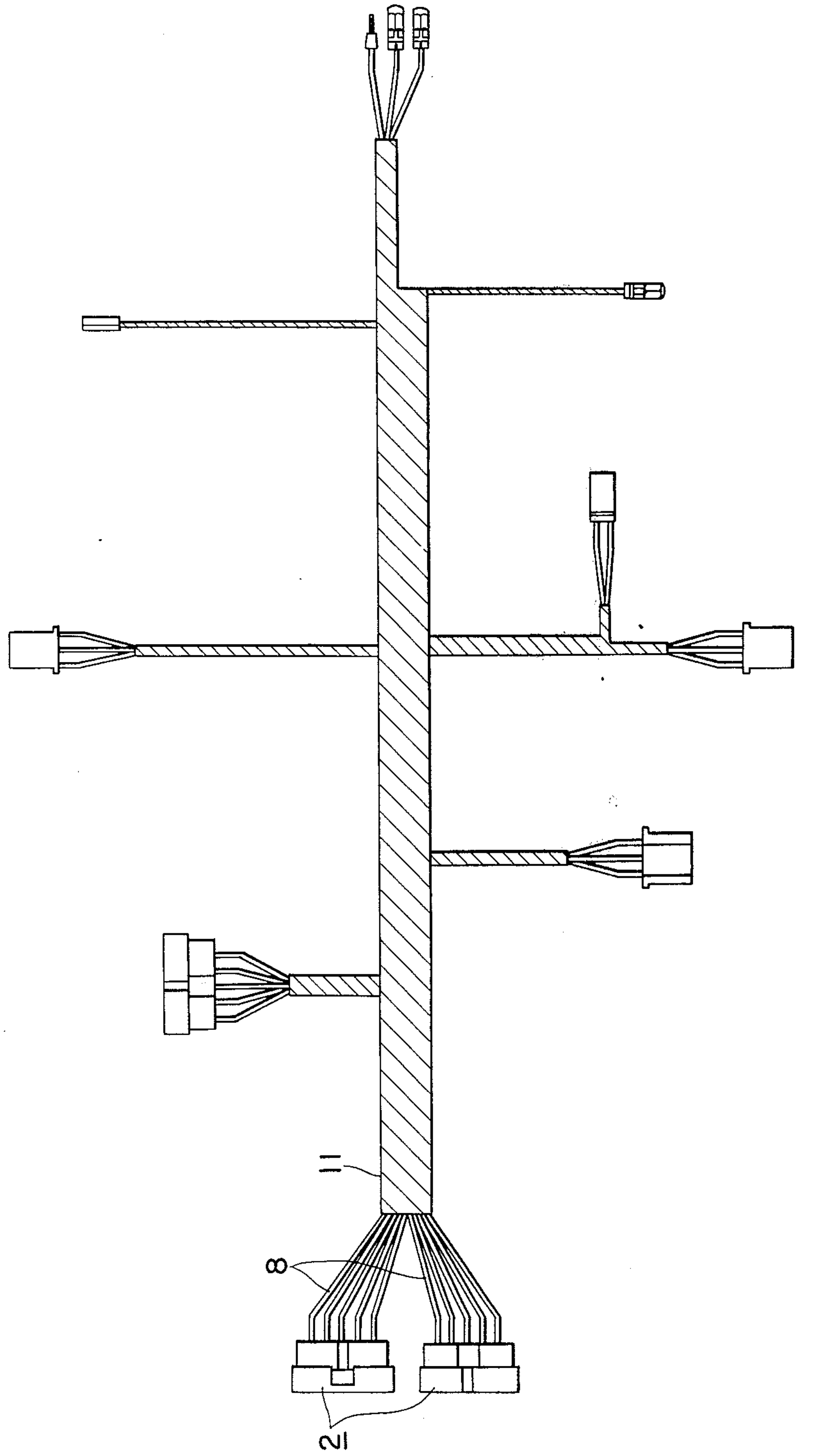

In an embodiment illustrated in FIG. 5, a connector 2 includes terminal fittings 3, each having a connection end previously inserted in a connector housing 6, the terminal fittings 3 in the connector housing 6 being held directly on a lower welding electrode 7, and the exposed ends 9 of laying wires 8 being overlapped on and connected to the connection ends of the fittings 3, respectively. Then, the overlapped portions are welded and a covering member 12 is attached to the connector housing 6 as shown in FIG. 6, and tapes 11 are applied as shown in FIG. 7. Thus, production of a wire-harness is completed.

Figure 8:
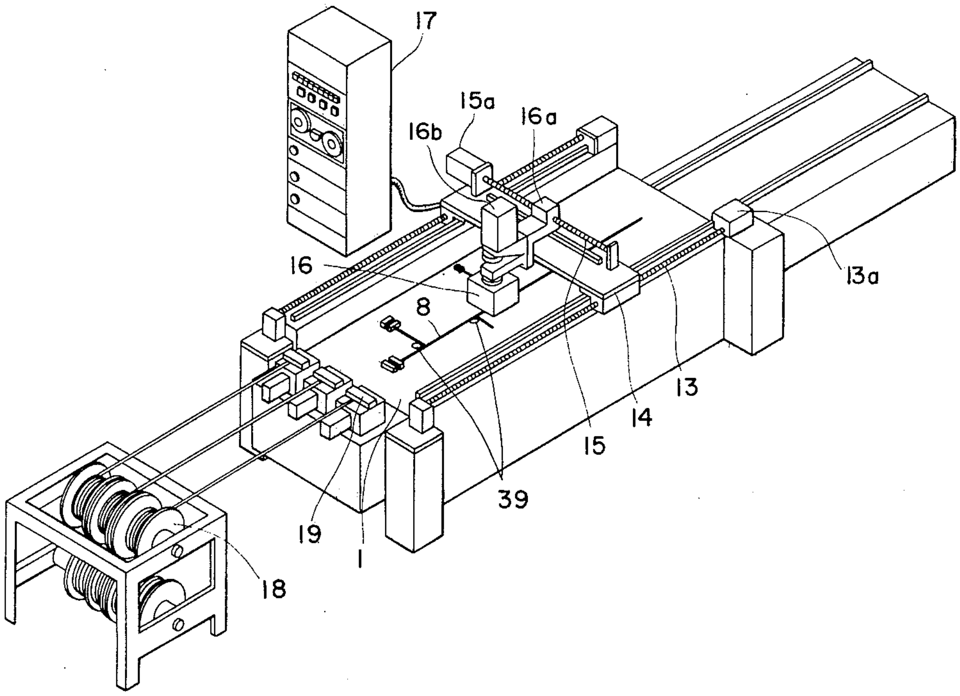
FIG. 8 is a perspective view of an apparatus for producing a wire-harness embodying the present invention.

FIG. 8 is a view illustrating the entire arrangement of an embodiment of the apparatus for practicing the present invention. X shafts 13 are disposed on both sides of a working stand 1 to extend in the longitudinal direction thereof, and a Y shaft 15 is disposed between supporting members 14 moving on said X shafts 13 a wire-laying head movably mounted onto the Y shaft 15. The X shaft 13 and Y shaft 15 are independently rotated by pulse motors 13*a* and 15*a*, respectively. By setting appropriately the rotation quantities of the shafts 13 and 15 with NC tape of an automatic control device 17, the wire-laying head 16 and a wire 8 held by the wire-laying head 16 are shifted to desirable points on the working stand 1. The wire-laying head 16 is rotatably attached to a holding stand 16*a* and the head 16 is rotated by a pulse motor 16*b*. All the wire-laying steps are programmed by the NC tape of the control device 17. Reference numeral 18 represents a wire reel station and reference numeral 19 represents a device for cutting a wire and removing a coating from the cut end of the wire.

Figure 9:
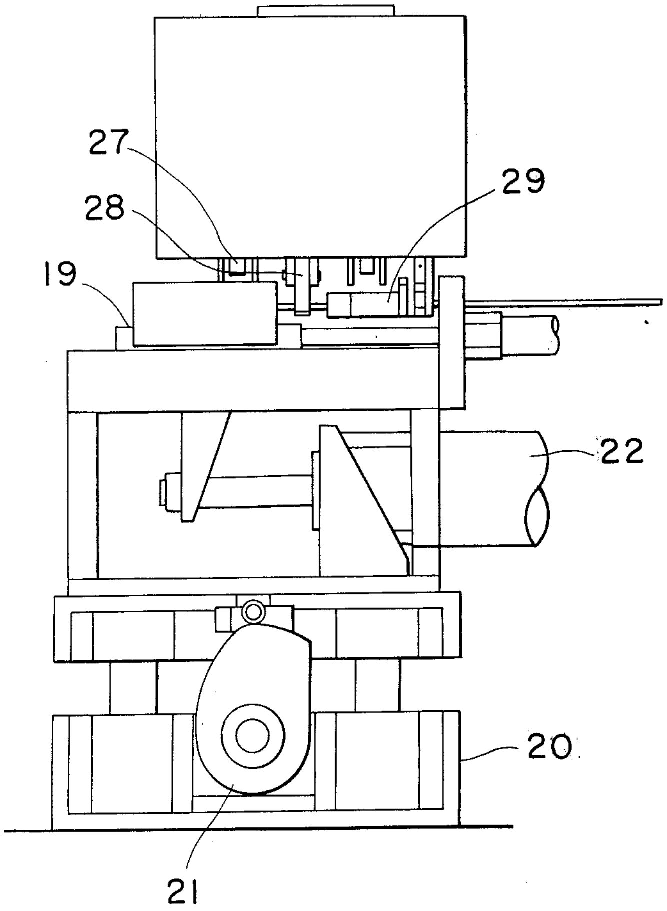
FIG. 9 is a side view showing the mutual relation between the wire-cutting and coat-removing device.
Figure 10:
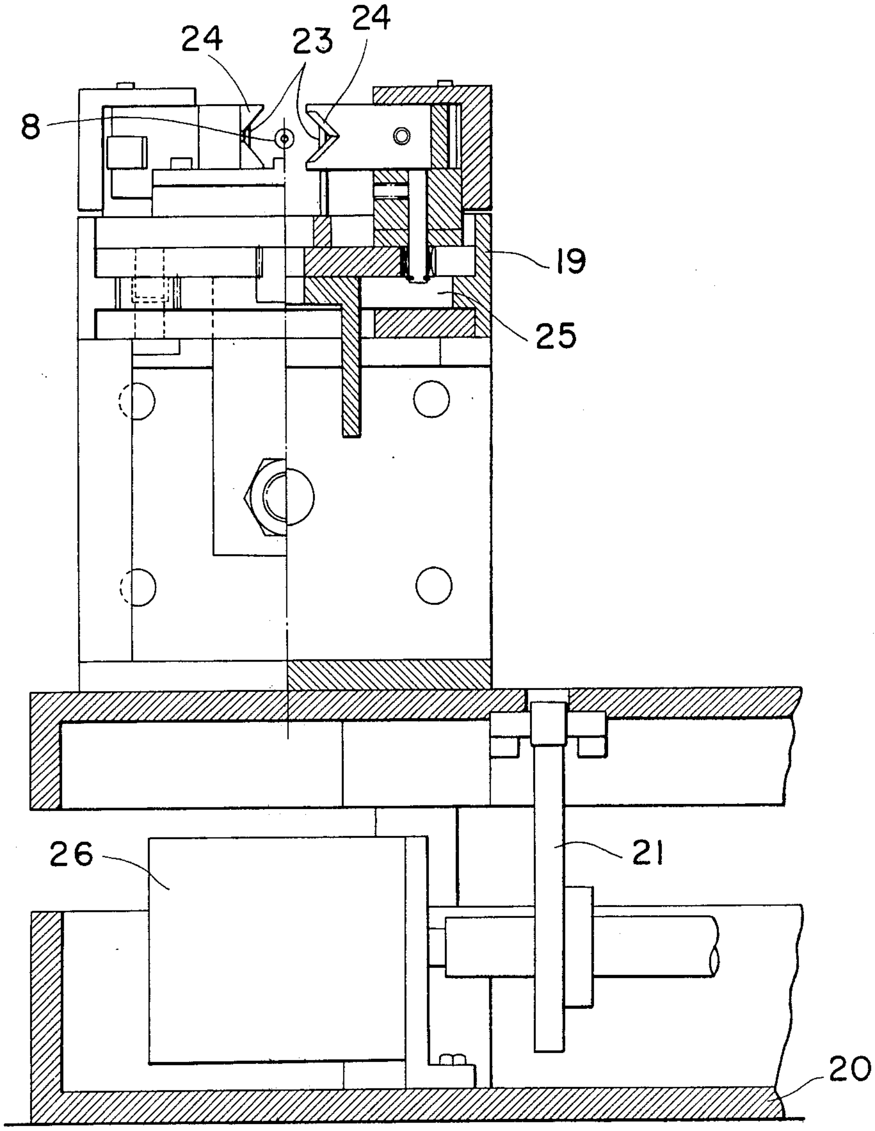
FIG. 10 is a vertical elevational section view of a wire-cutting and coat-removing device.
Figure 11:
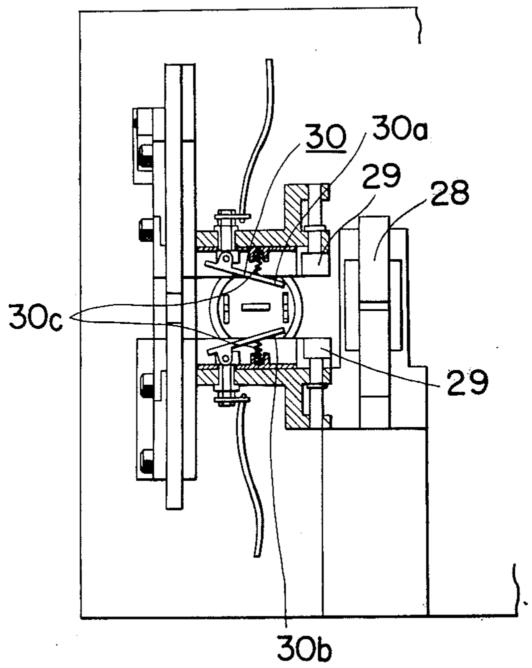
FIGS. 11 to 13 are transverse sectional views of principal parts of a wire-laying head.
Figure 12:
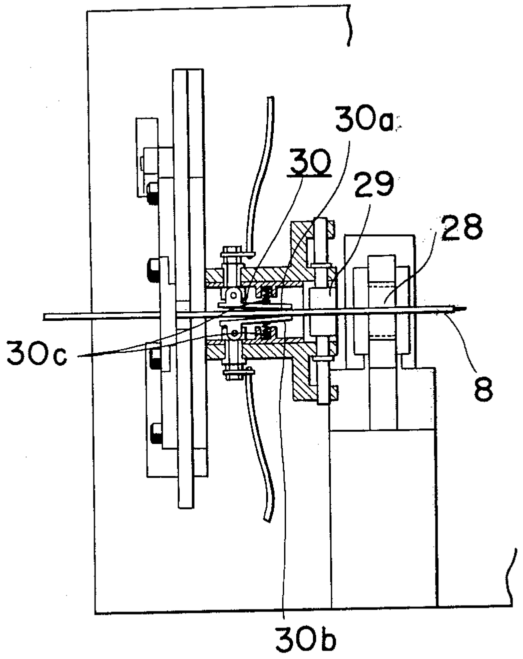
Figure 13:
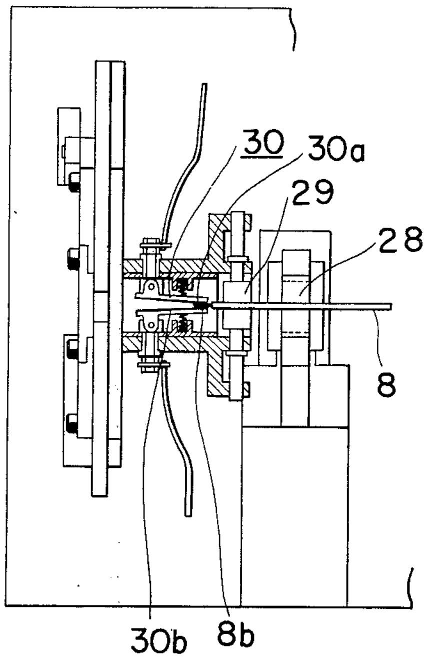

FIG. 9 is a side view illustrating the mutual relation between the wire-cutting and coating-removing device 19 and the wire-laying head 16. The device 19 is vertically and movably mounted on a base 20, and it is driven in the vertical direction by a cam 21. A driving cylinder 22 is disposed to operate a cutting knife 23 and a coat-removing knife 24. As shown in FIG. 10, these cutting knife 23 and coating-removing knife 24 are paired to face each other so that they can be both brought close together and separated from each other. The knives 23 and 24 are driven by the driving cylinder 22 through a cam plate 25. Reference numeral 26 represents a rotary actuator for vertical movement. Below the wire-laying head 16, a wire-inserting ram 27, a wire clamp 28, and a wire guide are arranged in this order from the front end. A wire end-confirming brush 30 is disposed in the rear of the wire guide 29. Structures of these members are illustrated in detail in the partially cut-out plane views in FIGS. 11 through 13. FIG. 11 illustrates the state before clamping of a wire, FIG. 12 illustrates the state where the wire is clamped, and FIG. 13 illustrates the state where the wire end is confirmed.

Figure 14:
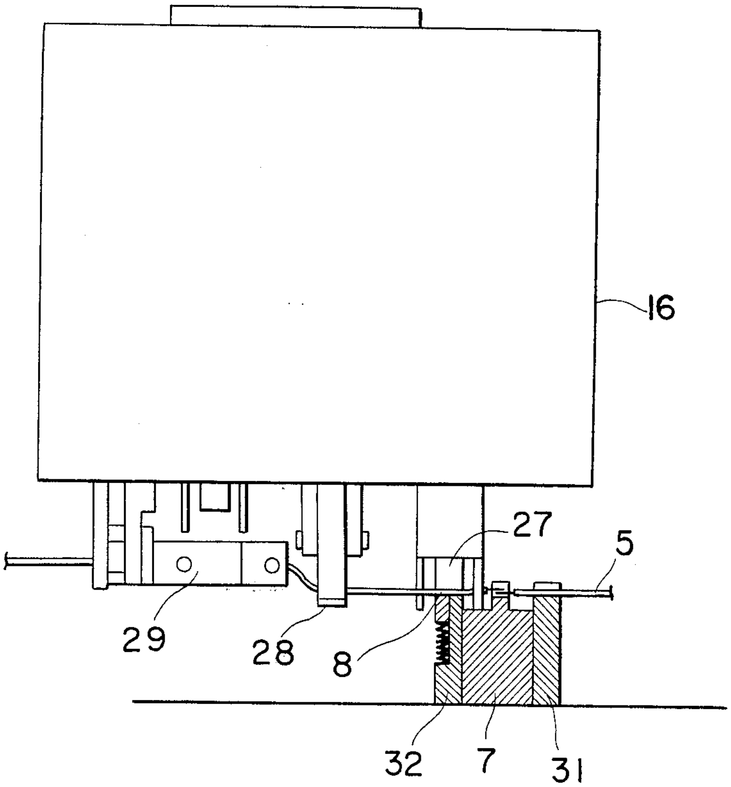
FIG. 14 is a side view showing a mutual relation between a wire-laying head and a connector.
Figure 15:
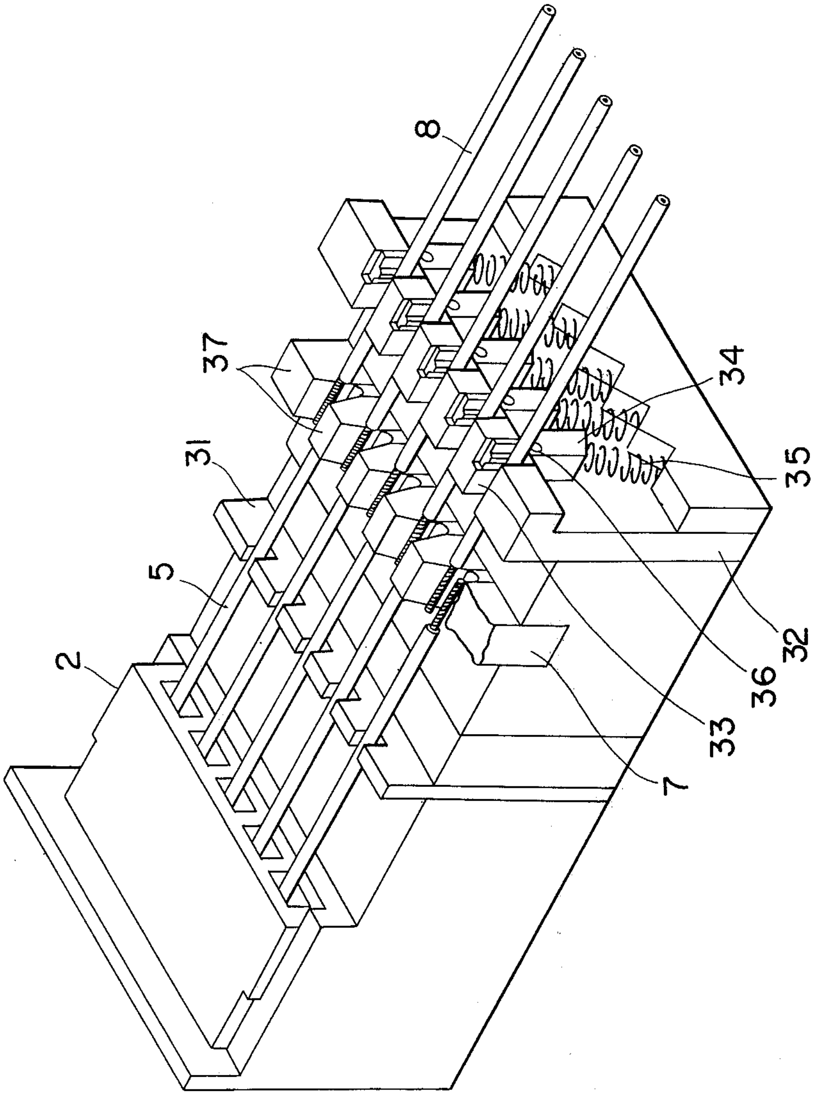
FIG. 15 is a perspective view showing the state of a connector and the laid wires.

FIG. 14 illustrates the mutual relation between the wire-laying head 16 and the connector 2. The end of a wire 8 is pressed down onto a lower welding electrode 7 by the wire-inserting ram 27. A member 31 for holding a lead wire 5 of the connector is disposed on one side of the lower welding electrode 7, and a member 32 for clamping and supporting the wire 8 is disposed on the other side of the lower welding electrode 7. The clamping and supporting member 32 includes clamping and supporting grooves 33, each having a wire clamp arm 34 therein, as shown in FIG. 15. Each clamp arm 34 is pressed toward the inner wall it is facing by a coil spring 35 through a fulcrum pin 36.

The clamping and supporting member 32 holds the wire during the wire-laying and welding steps, and it can hold and support one or more of the inserted wires 8.

When several wires are inserted in the clamping and supporting grooves 33, since a pressing portion **34*a* of the clamp arm 34 presses these wires simultaneously, the holding power of the arm 34 is dispersed in the respective wires, and is hence weakened. Accordingly, there is often caused a disadvantage that the end portions of the wires being laid are let to fall out of the clamping and supporting member 32**.

Figure 16:
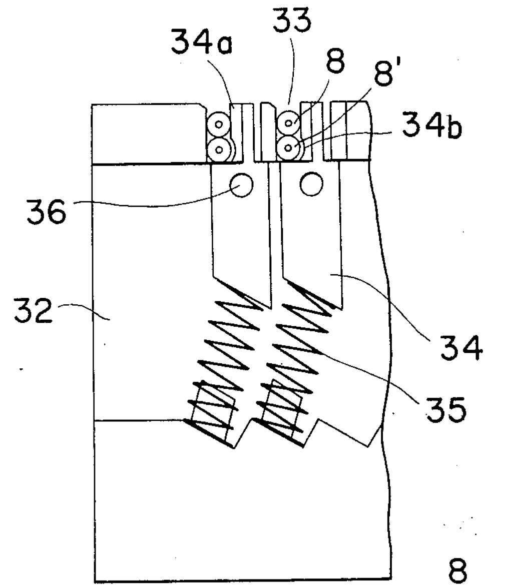
FIG. 16 is a front view of a wire clamping and supporting member.

In order to prevent the occurrence of this undesirable phenomenon, an escapement concave portion **34*b* is formed below the pressing portion 34*a* of the clamp arm 34 as shown in FIG. 16, so that only the wire 8 being laid is pressed and supported by the upper portion of the clamp arm 34 and the wire 8' which has already been inserted and supported is pressed down into the lower portion of the clamping and supporting groove 33 and put into the escapement concave portion 34*b* by the newly inserted wire 8. In this arrangement, the pressing power of the clamp arm 34 acts only on the newly inserted wire 8 and the wire 8' pressed down into the escapement concave portion 34*b* is held by the friction with the newly inserted wire 8**.

Figure 17:
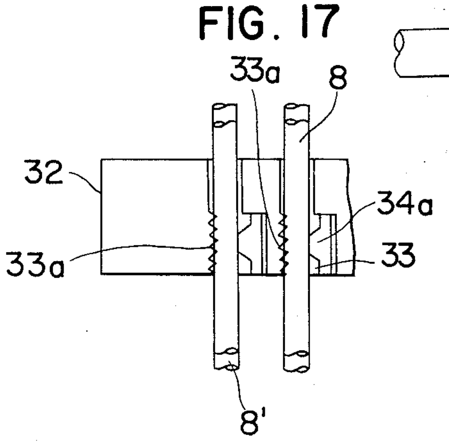
FIG. 17 is a plan view of a wire clamping and supporting member shown in FIG. 16.

The pressing portion **34*a* is formed as a projecting portion, and as shown in FIG. 17, on the wall facing this projecting portion, sharp-edged vertical walls 33*a* are formed to extend in a direction so as to cross rectangularly the axial direction of the wire. Accordingly, by virtue of the softness of the insulator of the wire, the wire can be pressed in the groove 33 with a weak force in the wire-inserting direction, i.e., the direction of the pointed projection formed on the wall facing the projecting portion 34*a* while the friction in the axial direction of the wire is increased to enhance the wire-holding force. Welding guides are formed on the lower electrode 7** to separate the respective connector elements from one another.

In the wire-harness, the conductor portion is a thick wire comprising several to scores of soft copper core wires, each having a diameter of 0.32 mm. Accordingly, when the welding is carried out by using electrodes of an ordinary shape, an entanglement or burr is formed on the core wires at the welded portion, and when a coating is molded on the welded portion at the subsequent step, an exposed portion is formed and a short circuit is readily formed when the harness is actually used.

Figure 18:
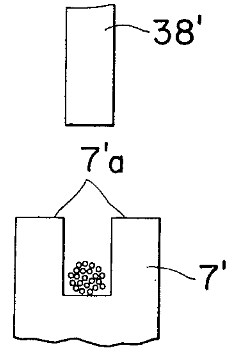
FIG. 18 is a diagram showing an undesirable welding electrode.

In order to avoid this undesirable phenomenon, it has been considered to adopt an arrangement where, as shown in FIG. 18, wire guide portion **7'*a* are formed on both the sides of the lower electrode 7', and the welding is carried out while the wire is located between the guides 7'*a*. In this case, however, when the side faces of the guides 7'*a* come into contact with the side face of the upper electrode 38', the current density is lowered at the welding portion and no effective heat generation is attained, but rather the heat escapes from both the guides 7'*a* of the lower electrode 7'**. Therefore, it is impossible to concentrate the heat at the welding portion where the temperature must be elevated, and appropriate welding becomes impossible.

Accordingly, it is necessary to use as the wire guide a material having a high insulating property, a low thermal conductivity, and an excellent heat resistance. A ceramic material is chosen as the material meeting these requirements.

Figure 19:
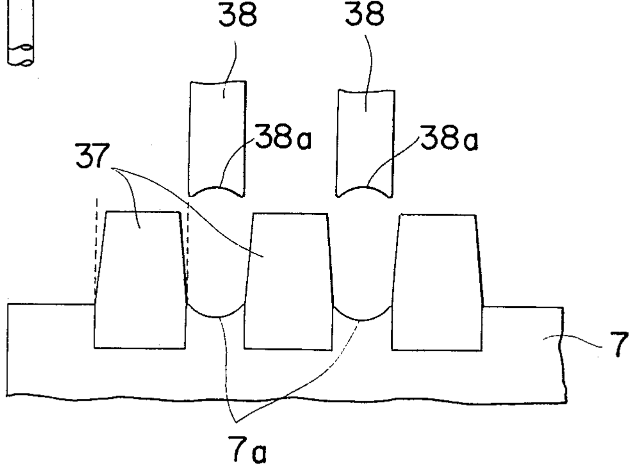
FIG. 19 is a front view of a welding electrode embodying the present invention.

In order to prevent a ceramic material from being damaged by the pressure imposed on the wire by the upper electrode at the welding step, as shown in in FIG. 19, the welding guide 37 is formed to rise with an inclination angle of 4° to 5° with respect to the lower electrode 7, so that the ceramic material is protected, and the withdrawal of the wire is facilitated.

Figure 20:
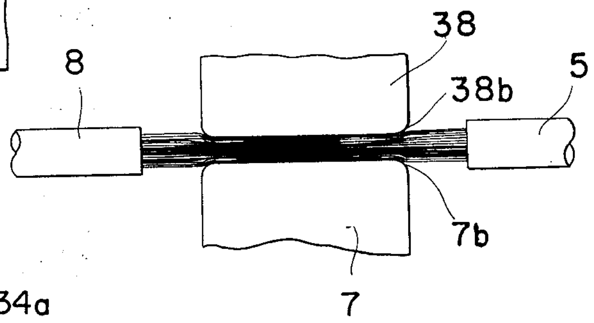
FIG. 20 is a side view of a welding electrode shown in FIG. 19.

Each of the lower electrode 7 and the upper electrode 38 has an arc-like concave portion **7*a* or 38*a* extending in the axial direction of the wire, and an arc-like corner part 7*b* or 38*b* is formed on the end in the axial direction of the arc-like concave portion 7*a* or 38*a*, as shown in FIGS. 20 and 21**. By this arrangement, the overlapped wires are gathered in an embraced state, and the section of the overlapped wires to be welded are made not flat, but arcuate. Moreover, welding can be performed without forming angular stepped parts in the vicinity of the boundary between the welded and non-welded portions, and it is possible to shape the welded portion in a form not so different from the form of the ordinary conductor portion. As a result, occurence of break-down at the welded portion can be effectively prevented.

FIG. 22 illustrates a branching pin 39. When the wire 8 being laid, i.e., the wire-laying head 16, arrives at the branching point, the pin 39 in the branching direction is raised to the level of the wire-laying head 16 by the actuator 40 for lifting up and bringing down the pin 39. After the branching pin 39 has been lifted up, the laying head 16 changes its direction to effect the branching operation from the trunk. After completion of the branching operation, the pin 39 is brought down by the actuator 40, and at this point, a head **39*a* formed on the top end of the pin 39 draws the wire downwardly and arranges the wire below the level of the laying head 16**.

When wires cut into a length corresponding to the distance between one connector and another connector, since the connectors have several connecting ends, and the distances between the connecting ends of one connector and those of another connector are not completely uniform, it often becomes impossible to connect the end of the cut wire to a specific connection end of the connector because of shortage in length. Further, when the number of wires to be connected to one connector is increased a bulge is formed at a point where the wires are bent or the wires are stretched intensely according to the state hung on the wire-laying pin 39, and it sometimes happens that laying-out becomes impossible.

This disadvantage will be overcome when the wire is cut into a length a little (by about 20 mm) longer than the prescribed length. In this case, it is impossible to detect how long the spare portion is when the wire arrives at the connector on the rear end. Therefore, it is impossible to move appropriately the wire-laying head with respect to this spare portion of the wire 8.

In the present invention, in order to overcome this disadvantage, a wire is cut in a length slightly longer than the prescribed length. The length of the spare portion is detected by confirming the rear end of the cut wire, and the wire-laying head 16 is retreated along a distance corresponding to the thus detected length of the spare portion, whereby wires having a sufficient margin are laid out effectively and conveniently. This feature will now be described.

An NC tape is arranged so that it emits instructions to cut a wire in a length slightly longer (by about 20 mm) than the prescribed length, and upon receipt of the instruction, a cutting device 19 is actuated to cut a wire in the instructed length and remove the coating at the cut end of the wire. After completion of the cutting operation, by instructions of the NC tape, the wire is shifted to the starting point A in FIG. 23 by the wire-laying head 16, and the front end 8*a* of the wire 8 is treated (since the front end is clamped at the prescribed position as in case of the conventional method, the end need not be confirmed).

Then, according to the branching instructions of the NC tape, the wire-laying head 16 is shifted along the wire 8 to the terminal point B for treating the rear end 8*b* of the wire 8 while hanging the wire 8 on the pin 39 for laying out the branched wire.

While the wire-laying head 16 travels from the starting point A to the terminal point B, the wire 8 is kept in the state gripped by a brush 30 for confirming the wire end, which is moved together with the head 16 along the wire 8. As shown in FIGS. 11, 12, and 13, the wire end-confirming brush 30 is disposed below the laying head 16 together with the wire-clamping member 28, and the wire guide 29. In the normal state, brush pieces 30*a* and 30*b* of the end-confirming brush 30 are opened as shown in FIG. 11. When it grips the wire 8, the brush 30 is caused to slide on the wire 8 by means of a spring 30*c* as shown in FIG. 12, and when the brush 30 arrives at the rear end of the wire 8, the brush pieces 30*a* and 30*b* fall in contact with the exposed conductor of the wire to form a short circuit, and the formation of this short circuit is transmitted as a signal of confirmation of the wire end.

Figure 23:
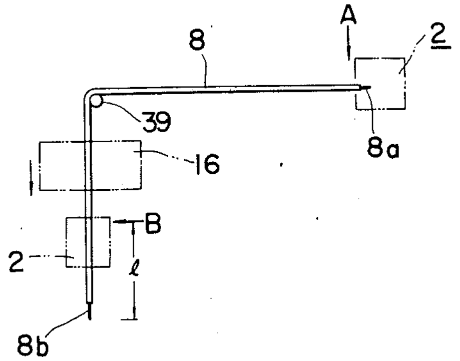
FIG. 23 is a diagram of the action of a wire-laying head.

In the foregoing embodiment, the wire-laying head 16 is shifted along the wire B according to instructions of the NC tape from the starting point A to the terminal point B controlled by the NC tape, and the excess length on the left which is unlaid when the head 16 arrives at the terminal point B is designated as length *l*. In FIG. 23, reference numeral 2 represents connectors to which the front end 8*a* and rear end 8*b* of the wire 8 are connected, respectively. The excessive portion of the wire 8 having a length *l* is treated and the rear end 8*b* is brought to the position of the connector 2 in the following manner.

The signal of arrival at the terminal point emitted by the NC tape is confirmed and stored, and the distance along which the wire-laying head 16 moves to the rear end 8*b* is counted (count-up). When the end-confirming brush 30 confirms the wire end, the movement of the head 16 and the counting are stopped, and the rear end 8*b* is gripped by the head 16. Then, the head 16 is moved in the reverse direction, and this return movement is counted (count-down). The head 16 is then stopped at the terminal point B to connect the rear end 8*b* to the connector 2.

Figure 24:
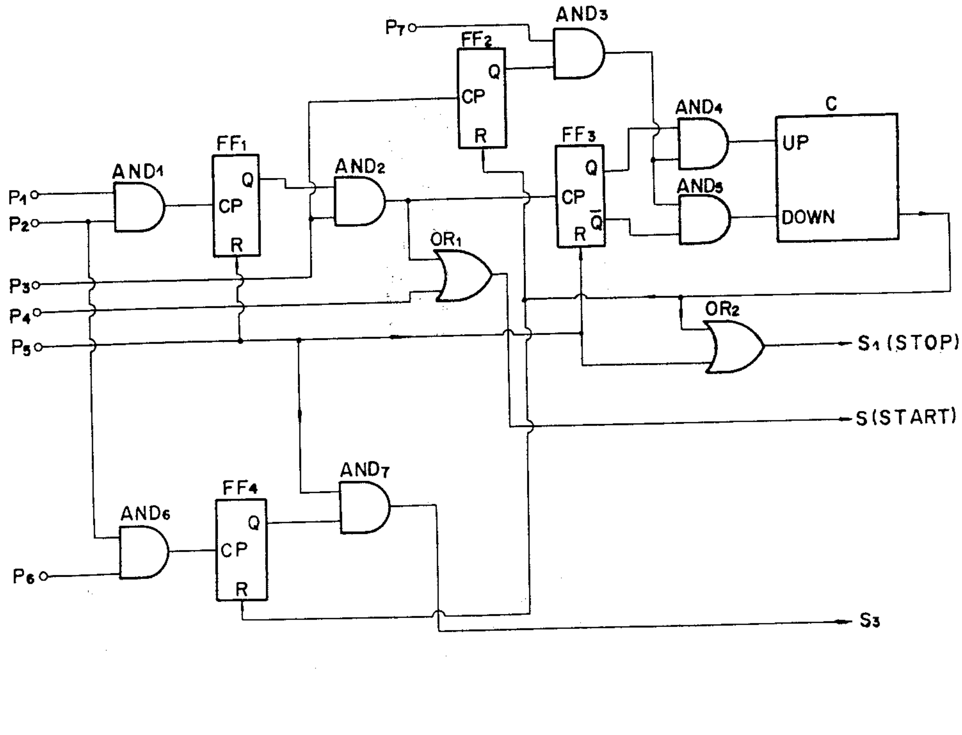
FIG. 24 is a control circuit of a wire-laying head.

The foregoing operations are performed and controlled by a control circuit shown in FIG. 24. Signals $P_1$, $P_2$, and $P_6$ are instruction signals emitted from the NC tape of the control device 17 to control the movement of the laying head 16 within the range of the prescribed length of the wire. The start signal $P_1$ is emitted every time the head 16 is to change its direction and initiate movement, and the rear end instructing signal $P_2$ is given only when the head 16 is shifted from the main portion toward the terminal point B of the branched portion. These signals $P_1$ and $P_2$ cause an "and" gate $AND_1$ to reverse a flip-flop $FF_1$, and a retention signal from this flip-flop $FF_1$ is continued until a rear end-confirming signal $P_5$ (the signal generated by the short circuit between the brush pieces 30*a* and 30*b* of the wire end-confirming brush 30) is given. A signal $P_3$ is a signal of point B emitted when the prescribed movement of the laying head 16 is completed, the head 16 is located at the terminal point B, and all the operations of the actuator of the wire laying machine are completed. This signal $P_3$ is out in an "and" gate $AND_2$ to which a signal from the flip-flop $FF_1$ is given. $P_4$ is a wire gripping signal emitted when after confirmation of the wire end 8*b* by the brush 30, the wire clamp 28 grips the wire 8, and $P_7$ is a signal for indicating the movement of the wire-laying head 16, which is arranged so that one pulse is generated every time the head 16 moves by a unit distance (0.1 mm).

$FF_2$ to $FF_4$ denote flip-flops, $AND_3$ to $AND_7$ denote "and" gates, $OR_1$ and $OR_2$ represent "or" gates, and C represents an up-down counter, which is adjusted so that one pulse is generated when the counter C reads "000". $S_1$ is a signal indicating the stop of the wire-laying head 16, and $S_2$ is a signal of reverse direction driving of the wire-laying head 16.

Figure 25:
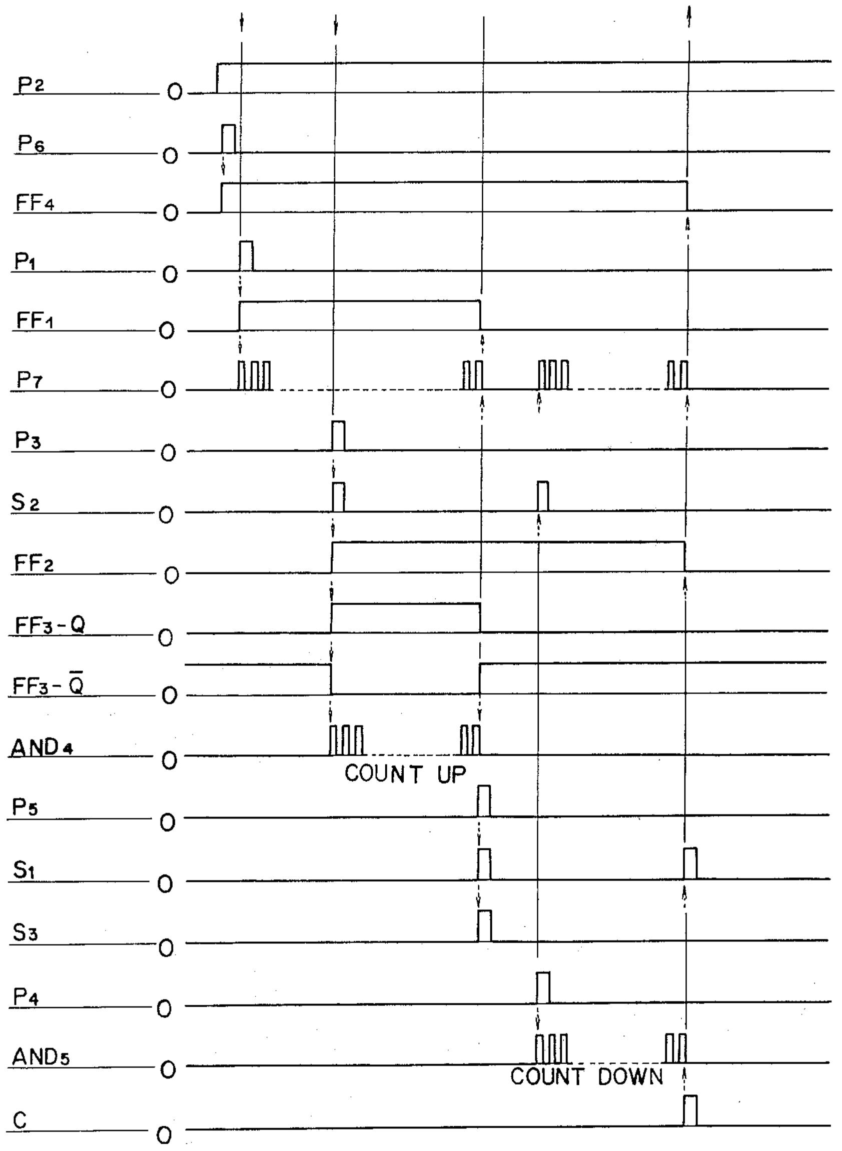
FIG. 25 is a chart for timing.

The operations of the control circuit having the above structure will now be described by reference to a time chart shown in FIG. 25.

When the rear end instructing signal $P_2$ is emitted, the "and" gates $AND_1$ and $AND_6$ are opened, and when the signal $P_6$ of normal direction driving of the wire-laying head 16 (movement toward the point B) is then emitted, a signal is emitted from the "and" gate $AND_6$ to reverse the flip-flop $FF_4$ and open the "and" gate $AND_7$.

In this state, when the signal $P_1$ of start to the point $P_1$ is given, a signal is emitted from the "and" gate $AND_1$ to reverse the flip-flop $FF_1$ and open the "and" gate $AND_2$.

During the above period, the wire-laying head 16 is moving toward the point B, and the moving signal $P_7$ is emitted according to this movement of the head 16, but since the "and" gate $AND_3$ is closed, no motion is given to the circuit.

When the wire-laying head 16 arrives at the point B, all the mechanical operations are terminated and the signal $P_3$ indicating the arrival at the point B is emitted to cause the "and" gate $AND_2$ to emit a signal. As a result, the start signal $S_2$ for further moving the wire-laying head 16 toward the rear end 8*b* is emitted from the "or" gate $OR_1$. Simultaneously, the flip-flop $FF_3$ is reversed and the "and" gate $AND_4$ is opened. The signal $P_3$ indicating the arrival at the point B is put also in the flip-flop FF to reverse it and open the "and" gate $AND_3$.

Pulses of the movement signal $P_7$ are emitted while the wire-laying head 16 is moved toward the rear end 8*b* from the point B as the start point, and they are put in an "up" terminal of the counter C through "and" gates $AND_3$ and $AND_4$. Thus, the up-down counter C counts up the distance the wire-laying head 16 moves.

When the wire-laying head 16 is moved toward the rear end 8*b* and a short circuit is formed between the brush pieces 30*a* and 30*b* of the wire rear end confirming brush 30 through the rear end 8*b*, the rear end-confirming signal $P_5$ is emitted to reset the flip-flops $FF_1$ and $FF_3$, and the stop signal $S_1$ is emitted from the "or" gate to stop the wire-laying head 16. By resetting the flip-flop $FF_3$, the "and" gate $AND_4$ is closed, and the other "and" gate $AND_3$ is opened. Moreover, since the rear end-confirming signal $P_5$ is put also in the "and" gate $AND_7$, the signal $S_3$ of the reversely directed driving of the wire-laying head 16 is emitted from the opened "and" gate $AND_7$ to move the head 16 backwardly to the point B.

When the wire 8 is then gripped by the wire clamp 28, the wire gripping signal $P_4$ is put out to cause the "or" gate $OR_1$ to emit the signal $S_5$ for starting the wire-laying head 16.

As a result, the wire-laying head 16 is moved backwardly toward the point B, and the movement signal $P_7$ is put in a "down" terminal of the up-down counter C through the opened "and" gate $AND_5$, and the above counted-up number is counted down.

As the wire-laying head 16 is moved backwardly, count-down is advanced, and when the counter C reads "000" again, a signal is put out from the counter C to reset the flip-flops $FF_2$ and $FF_4$. Simultaneously, the signal $S_4$ for stopping the head 16 is put out from the "or" gate $OR_2$.

At this point, the wire-laying head 16 is located at the point B. Accordingly, the rear end 8*b* of the wire 8 is treated by the actuator in the head 16, according to the customary method. Then, the head 16 is returned to the original position for treating another wire in the same manner according to the instructions of the NC tape.

In the case of treating a wire having an excessive portion *l* of 20 mm, count-up is started when the wire-laying head 16 initiates movement toward the wire end 8*b* from the point B, and the counter C reads "200" when the head 16 arrives at the rear end 8*b*. When the backward movement of the head 16 is started, count-down is performed from "200" to "000". When the counter C reads "000", the head 16 is returned to the point B.

In the foregoing embodiment, the control system is provided for one shaft alone,,but in general, the control system is provided for each of both the shafts X and Y, and the control is effected with respect to both the shafts. In the case where the tape extended from the branching point to the point B includes a wire on one shaft alone, the movement of detecting the rear end is performed on said one shaft alone, and when the tape includes wires on both the shafts, after detection of the rear end on one shaft, the head 16 is turned by 45° and is then moved in this direction to confirm the rear end on the other shaft and treat this rear end.

Figure 26:
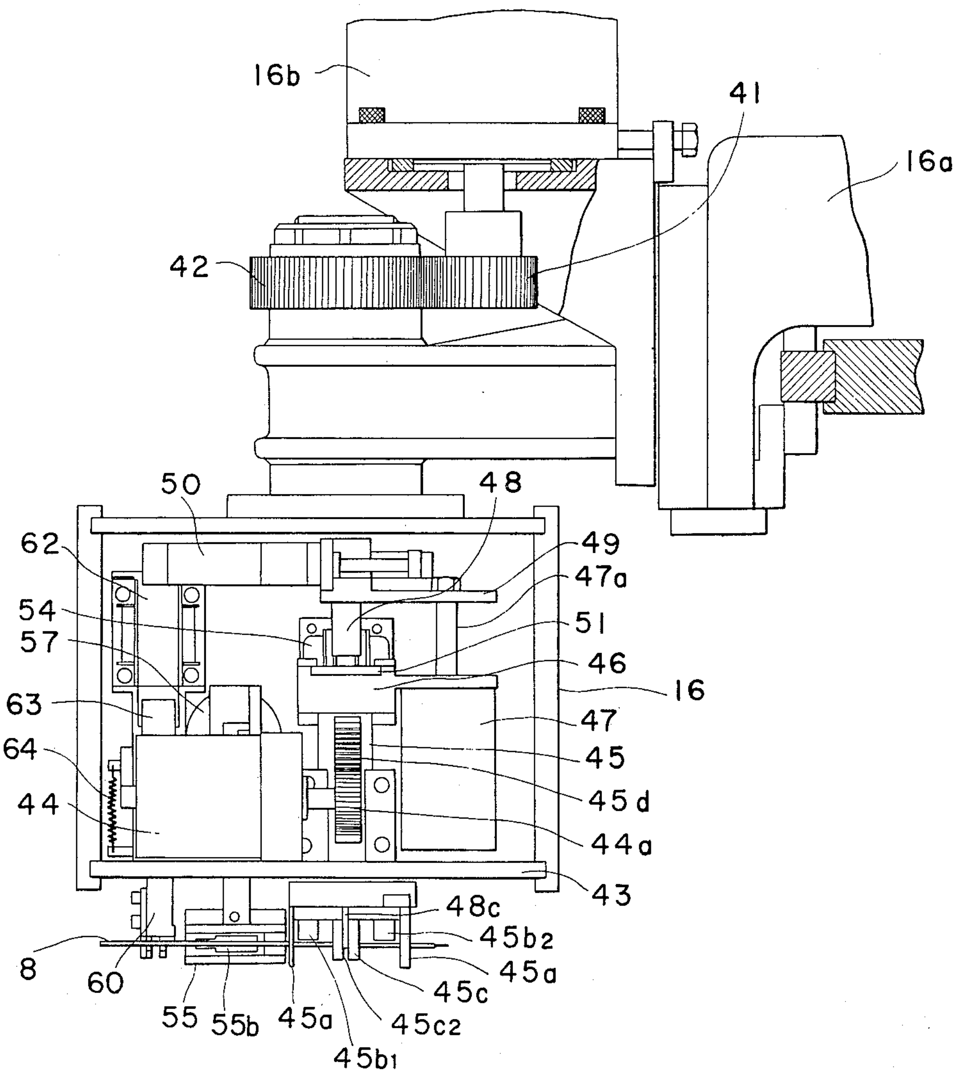
FIG. 26 is a side view of a wire-laying head of another embodiment of the present invention.

The structure of the wire-laying head will now be described in detail by reference to FIGS. 26 to 31. FIG. 26 shows the entire arrangement of the wire-laying head 16. Reference numerals 16*a* and 16*b* represent a head holding stand and a pulse motor, respectively, and the wire-laying head 16 is rotated through gears 41 and 42.

A turning cylinder 44 having a pinion 44*a* on the top end of a rotation shaft thereof is mounted on a lower frame 43 of the head 16, and the pinion 44*a* is engaged with a rack 45*d* of a wire treating member 45 including a wire guide 45*a*, a wire inserting ram 45*b* and a wire holding member 45*c* having crossing longitudinal groove $45c_1$, and lateral groove $45c_2$ formed on the lower face thereof.

Namely, the wire treating member 45 is arranged so that it is moved in the vertical direction by the turning cylinder 44 through the rack 45*d* and pinion 44*a*.

A piston cylinder 47 is attached to the wire treating member through an attachment member 46, and a piston 47*a* of the piston cylinder 47 is attached to a bearing 49 of a wire clamp rod 48. Accordingly, the wire clamp rod 48 is moved in the vertical direction by the operation of the piston cylinder 47.

A turning cylinder 50 is mounted on the bearing 49, and a gear of a rotation shaft of the turning cylinder 50 is engaged with a gear 48*a* disposed on the top end of the wire clamp rod 48. Accordingly, the wire clamp rod 48 is rotated by the operation of the turning cylinder 50.

A notch 48*b* is formed in an intermediate portion of the wire clamp rod 48 along the entire circumference thereof, and a stopper 51 having a series of holes having diameters corresponding to the diameters of the notch 48*b* and wire clamp rod 48 is guided in the notch 48*b*. One end of this stopper 51 is stretched to a lateral frame 53 by a stretching spring 52, and a plunger 54 mounted on the wire treating member 45 is attached to the other end of the stopper 51. When the plunger 54 is de-energized, the notch 48*b* of the wire clamp rod 48 is set in a condition released from the action of the stopper 51, and when the plunger 54 is energized, the small-diameter hole of the stopper 51 becomes engaged with the notch 48*b* to inhibit the vertical movement of the wire clamp rod 48. In this state, the piston 47*a* of the piston cylinder 47 is located at an intermediate point of the vertical movement range thereof.

The wire clamp rod 48 pierces the interior of the wire treating member 45 in the vertical direction, and the lower end of the rod 48 is tapered and an L-shaped wire clamp pin 48*c* is formed on this tapered end. This wire clamp pin 48*c* is projected in the vicinity of one lateral groove of the wire holding member 45*c*.

As will be apparent from the foregoing illustration, the wire guide 45*a* projected downwardly to the lower frame, the wire inserting ram 45*b*, the wire holding member 45*c*, and wire clamp pin 48*c* are simultaneously moved in the vertical direction by the operation of the turning cylinder 44. Only the wire clamp pin 48*c* is moved in the vertical direction with respect to the wire holding member 45*c*, by the operation of the piston cylinder 47, and is rotated by the operation of the turning cylinder 50.

Figure 27:
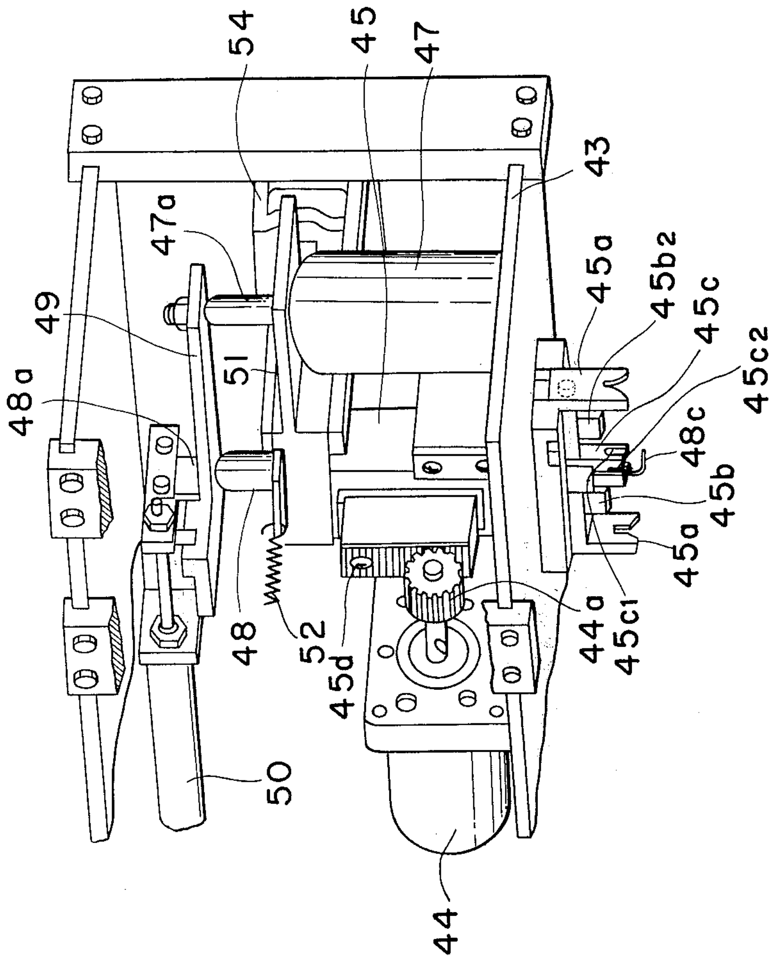
FIG. 27 is a perspective view of principal parts of a wire-laying head shown in FIG. 26.

Accordingly, a wire placed on the wire clamp pin 48*c* is not rotated when the pin 48*c* is in the state shown in FIG. 27, and when the wire is raised and is held in the notch 48*b* by the stopped 51, it is guided by the cooperation of the stopper 51 and the longitudinal groove $45c_1$ of the wire holding member 45*c*. When the stopper 51 separates from the notch 48*b* and is located at the uppermost position, the wire is clamped in the interior of the longitudinal groove $45c_1$ of the wire holding member 45c with the cooperation of the stopper 51 and the wire holding member 45c.

Figure 28:
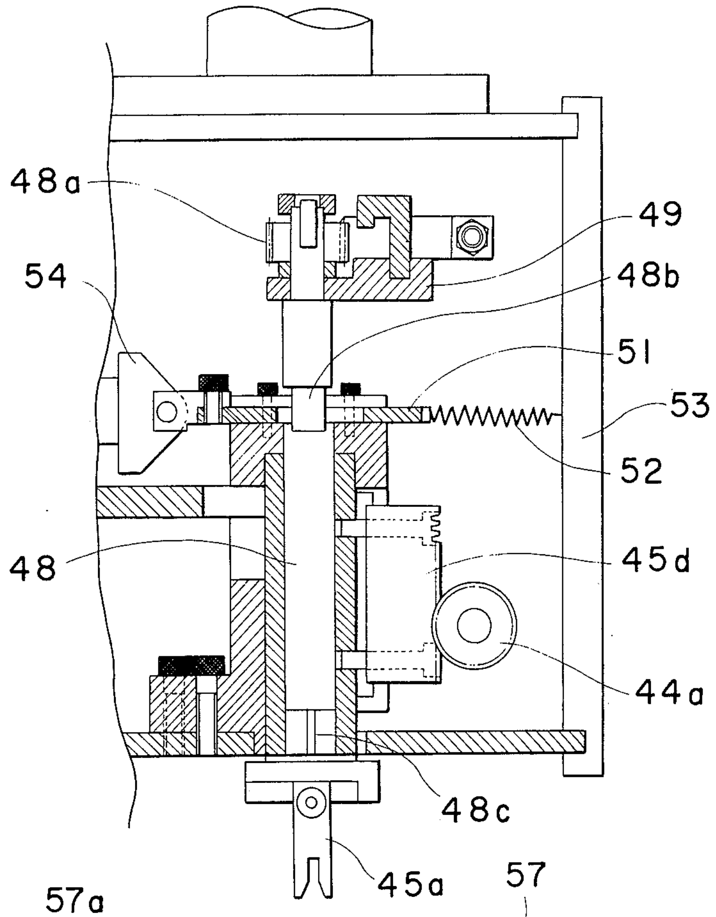
FIG. 28 is a vertical section view of a wire clamp rod.

The above-illustrated mechanism is shown in a perspective view of FIG. 27, and the wire clamp rod 48 is specifically illustrated in FIG. 28.

Figure 29:
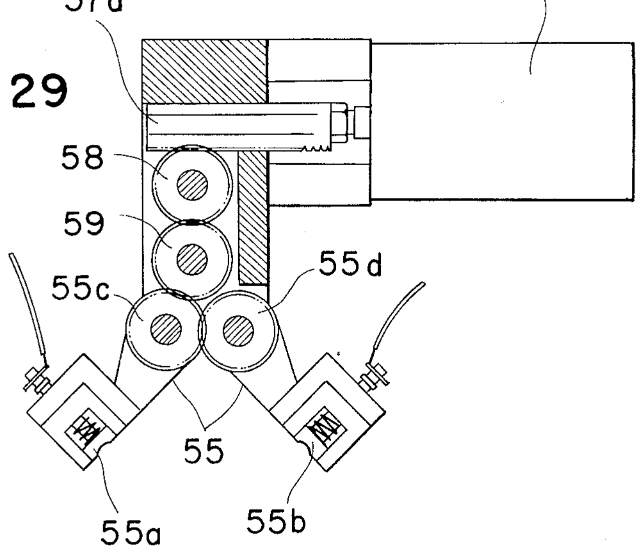
FIG. 29 is a diagram of a wire end detecting member.

Referring to FIG. 26 again, a wire end detecting member 55 has two facing brushes 55a and 55b shown in FIG. 29, and the brushes 55a and 55b are opened and closed by the operation of the piston cylinder 57 attached to a lateral wall 56. More specifically, when the piston cylinder 57 is operated, the operation of the rack 57a attached to the piston of the piston cylinder 57 is transmitted to gears 55c and 55d on the base shaft of the wire end detecting member through the pinion gears 58 and 59. When the brushes 55a and 55b are opened, the wire end detecting member 55 guides the wire, and when the coating-removed exposed end of the wire, namely a conductor, is located at brushes 55a and 55b, a short circuit is formed between the brushes 55a and 55b, and a wire end detecting signal is emitted therefrom. In FIG. 26, only one brush 55b is specifically illustrated.

Figure 31:
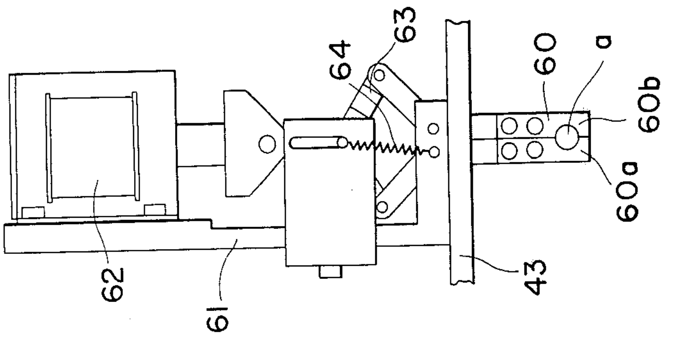
FIG. 31 is a front view of an anxiliary wire clamp.
Figure 30:
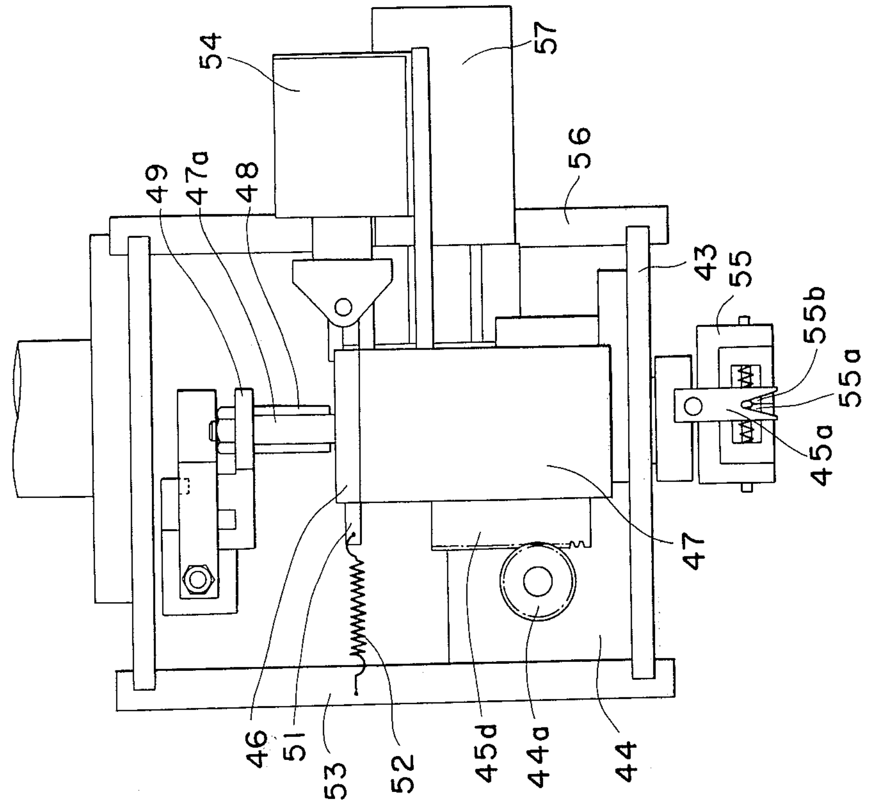
FIG. 30 is a front view of a wire-laying head shown in FIG. 29.

An auxiliary wire clamp 60 comprises gripping pieces 60a and 60b that can be opened and closed. When they are closed, a slip hole *a* is formed as shown in FIG. 31. The opening or closing of the auxiliary wire clamp 60 is performed by the operation of a plunger 62 through a link mechanism 63. The plunger 62 is fixed to the lower frame 43 with an attachment member 67. In the normal state, the plunger 62 is projected by a stretching force of a spring 64, and the gripping pieces 60a and 60b are closed as shown in FIG. 31. When the plunger 62 is excited, the gripping members 60a and 60b are opened by the link mechanism 63.

The above-mentioned wire end detecting member 55 and auxiliary wire clamp 60 are only opened and closed, but they do not make any vertical movement unlike the wire guide 45a, inserting ram 45b, wire holding member 45c, and wire clamp pin 48c. Each of the piston cylinder 57 for opening and closing the wire end detecting member 55, the plunger 62 for opening and closing the auxiliary wire clamp 60, the turning cylinder 5 for rotating the wire clamp pinion 48c, the piston cylinder 47 for moving the wire clamp pinion 48c, the plunger 54 for holding the pinion 48c at the intermediate position, and the turning cylinder 44 for simultaneously moving the wire clamp pinion 48c, the wire guide 45a, the inserting ram 45b, and the wire holding member 45c is operated by instructions from an NC tape of the automatic control device 17.

The wire-laying operation of the wire-laying head 16 having the above structure will now be described. When the wire-laying head 16 is not being operated, it is located at the original point (*X*, *Y* = 0), and the head 16 is appropriately moved and rotated on the working stand 1 by the pulse motor 13a of the X shaft 13, the pulse motor 15a of the Y shaft 15 and the pulse motor 16b. These pulse motors are instructed by the NC tape of the automatic control device 17. At the original point, the wire end detecting member 55 and auxiliary wire clamp 60 are opened, and the wire treating member 45 and wire clamp rod 48 are at the elevated positions.

A wire 8 is drawn to the wire-cutting and coating-removing device 19 from the reel station 18, and the coating of the top end of the wire 8 is removed.

When the wire-laying head 16 is moved from the original point onto the wire-cutting and coat-removing device 19, and its position is confirmed, the device 19 is lifted up to release holding of the wire 8, and the wire clamp pin 48c of the wire-laying head 16 is brought down on the pin 48c and catches thereon the top end of the wire 8. In this state, the wire 8 is clamped at the uppermost position in the longitudianl groove $45c_1$ of the wire holding member 45c, in a condition guided by this groove $45c_1$.

In order to avoid occurrence of any trouble by the turning of the wire-laying head 16 or the like during this step, the auxiliary wire clamp 60 is closed to guide loosely the wire 8 in the slip hole *a*.

When the top end of the wire 8 is clamped in the abovementioned manner, the wire-laying head 16 is moved toward the center of the working stand 1 to draw out the wire 8 by a necessary length. At this point, the wire 8 is cut and the coating is removed from both the cut ends by the wire-cutting and coating-removing device 19, whereby a wire 8 having a prescribed length is obtained.

Then, the wire-laying head 19 advances toward the connector 2 to which the wire is to be connected, and it stops when the exposed conductor portion of the wire 8 clamped at the coated portion is located on the connection end of the connector 2. Then, the wire treating member 45 is brought down while the wire 8 is kept in the clamped state.

The wire clamping and supporting member 32 having grooves supporting a plurality wires is attached independently to the vicinity of the connector 2, and when the wire treating member 45 is brought down, the clamped wire 8 is pressed into one of the grooves of the clamping and supporting member 32 by means of the pressing ram 45b. Accordingly, the exposed conductor portion of the wire 8 is placed on the terminal fitting of the connector 2, and the coated portion of the wire is gripped on one groove of the wire clamping and supporting member 32. Thus, a state is attained in which the exposed conductor portion of the wire 8 is overlapped on the connection end of the connector.

Then the wire clamp pin 48c is brought down, and at this moment the stopper 57 is operated so that the small-diameter hole of the stopper 51 is located at the notch 48b of the wire clamp rod 48, and the rod 48 is stopped at a certain intermediate position in the vertical movement range thereof. Accordingly, by the co-operation of the wire clamp pin 48c and the longitudinal groove $45c_1$ of the wire holding member 45c, the clamped state of the wire 8 is converted to the guided state. At this point, the wire end detecting member 55 is closed to cause the brushes 55a and 55b to fall in contact with the wire 8.

Next, the wire treating member 45 is lifted up and the wire-laying head 16 is moved onto the working stand 1 toward the connecter 2 while the wire 3 is temporarily held on the wire clamping and supporting member 32. During this movement, the head 16 is allowed to have sliding contact with the wire 8 by the auxiliary wire clamp 60, the wire end detecting member 55, the wire holding member 45c, and the wire clamp pin 48c.

While the wire-laying head 16 is thus moved, the brushes 55a and 55b of the wire end detecting member 55 is caused to fall in contact with the exposed conductor of the other end of the wire 8, and at this moment, a signal is emitted from the brushes 55a and 55b to stop movement of the head 16 and open the wire end detecting member 55. Simultaneously, the stopper 51 is returned to the original position and the wire clamp rod 48 is lifted up to the uppermost position to clamp the coated portion on the side of the other end.

Then, the wire-laying head 16 is moved near the connector 2, and in the same manner as described above, with respect to temporary holding of said one end portion of the wire on the connector 2, the other end portion of the wire 8 is temporarily held so that the coated portion is gripped in the wire clamping and supporting member 32 by the pressing ram 45*b*, and the exposed conductor portion is located on the connection end of the connector 2.

At this point, the wire clamp pin 48*c* is brought down to the lowermost position and is rotated to separate from the wire 8. Then the pin 48*c* is turned to return to the original position and is lifted up to the uppermost position. The wire treating member 45 is also lifted up, the wire 8 is separated from the wire-laying head 16, and the head 16 is returned to the original point.

By the above-mentioned operations, one wire is laid out between the two connectors 2.

In the foregoing embodiment, piston cylinders 47 and 57, turning cylinders 44 and 50, and plungers 54 and 62 are used as sources for driving respective members of the wire-laying head 16. However, as will be apparent to those skilled in the art, the driving sources are not limited to these members specifically illustrated and various ones can be made. For example, plungers or pulse motors and gear can be used instead of the piston cylinders 47 and 57 or turning cylinders 44 and 50. Further, pulse motors or plungers and gears may be used instead of the turning cylinders 44 and 50, and piston cylinders may be used instead of the plungers 54 and 62. If a pulse motor is used instead of the piston cylinder 47, the plunger 54 and the stopper 51 need not be provided, and the notch 48*b* need not be formed. The wire end detecting member 55 has a function of determining the distance of the movement of the wire-laying head 16, while being in sliding contact with the wire. If this moving distance is recorded in the NC tape of the automatic control device 17, and the pulse motor 13*a* of the X shaft 13 and the pulse motor 15*a* of the Y shaft 15 are controlled by instructions of the NC tape, provision of the wire end detecting member 55 and the piston cylinder 57 as the drive source can be omitted.

The steps of the wire-laying method using the apparatus having the above structure will now be described.

(1) A wire of a necessary length is drawn out from the reel station, and it is set on the wire-cutting and coating-removing apparatus 19.

(2) Connectors 2 are set on the working stand 1 at intervals corresponding to intervals in the product, so that connection ends thereof are held on the lower electrode 7.

(3) The wire is fed to the original point (of the shafts X and Y) of the machine.

(4) Selection of the wire is performed according to the program of the control device 17, and the wire-laying head 16 is shifted to the fixed position of the wire-cutting and coating-removing device 19.

(5) After confirmation of the position of the head 16, the device 19 is lifted up, and the wire is stretched between the wire guide 29 and wire clamp 28 in the head 16. After confirmation of the rising of the device 19, the guide 29 and clamp 28 are closed.

(6) After the wire has been clamped, the wire-cutting and coating-removing device 19 is brought down.

(7) After confirmation of the lowering of the device 19, according to the program of the control device 17, a prescribed length of the wire is drawn out by the X shaft 13 with the movement of the head 16, and the wire length is measured.

(8) After the measurement of the wire length, the wire-cutting and coating-removing device 19 is lifted up to effect the cutting of the wire and the removal of the coating.

(9) After the wire is cut and the coating is removed, the device 19 is brought down.

(10) According to the program of the control device 17, the head 16 is moved on the shafts X and Y so that the cut end of the wire is overlapped on the connection end 4 of the connector 2.

(11) After the position of the head 16 is set, the wire clamp 28 and wire inserting ram 27 are brought down, and the wire is inserted into the wire clamping and supporting member 32 and is held thereby so that the exposed end portion 9 of the wire 8 is located on the lower welding electrode 7.

(12) After insertion of the wire, the wire clamp 28 of the wire-laying head 16 is opened and lifted up. Simultaneously, the wire inserting ram 27 is similarly lifted up.

(13) According to the program of the control device 17, the head 16 is shifted by movements of the shafts X and Y, and the wire is laid out by the wire guide 29 disposed in the head 16.

In the case where the wire is branched from the main portion, when the wire-laying head is shifted to the branched area by movements of the shafts X and Y, the branched wire-laying pin 39 is projected to a position capable of catching the wire 8 according to instructions of the control device 17, and according to the program, the head 16 is then turned to effect laying-out of the branched wire.

(14) Then, the wire-laying head 16 is exchanged with a welding head, and according to the prescribed program, the upper electrodes are brought down in succession to weld the overlapped ends 4 and 9.

(15) After the welding operation, the entire assembly is dismounted from the working stand 1, a coating is formed on the welded portion, and a gathering adhesive tape is applied. Thus, production of a wire-harness is completed.

Figure 32:
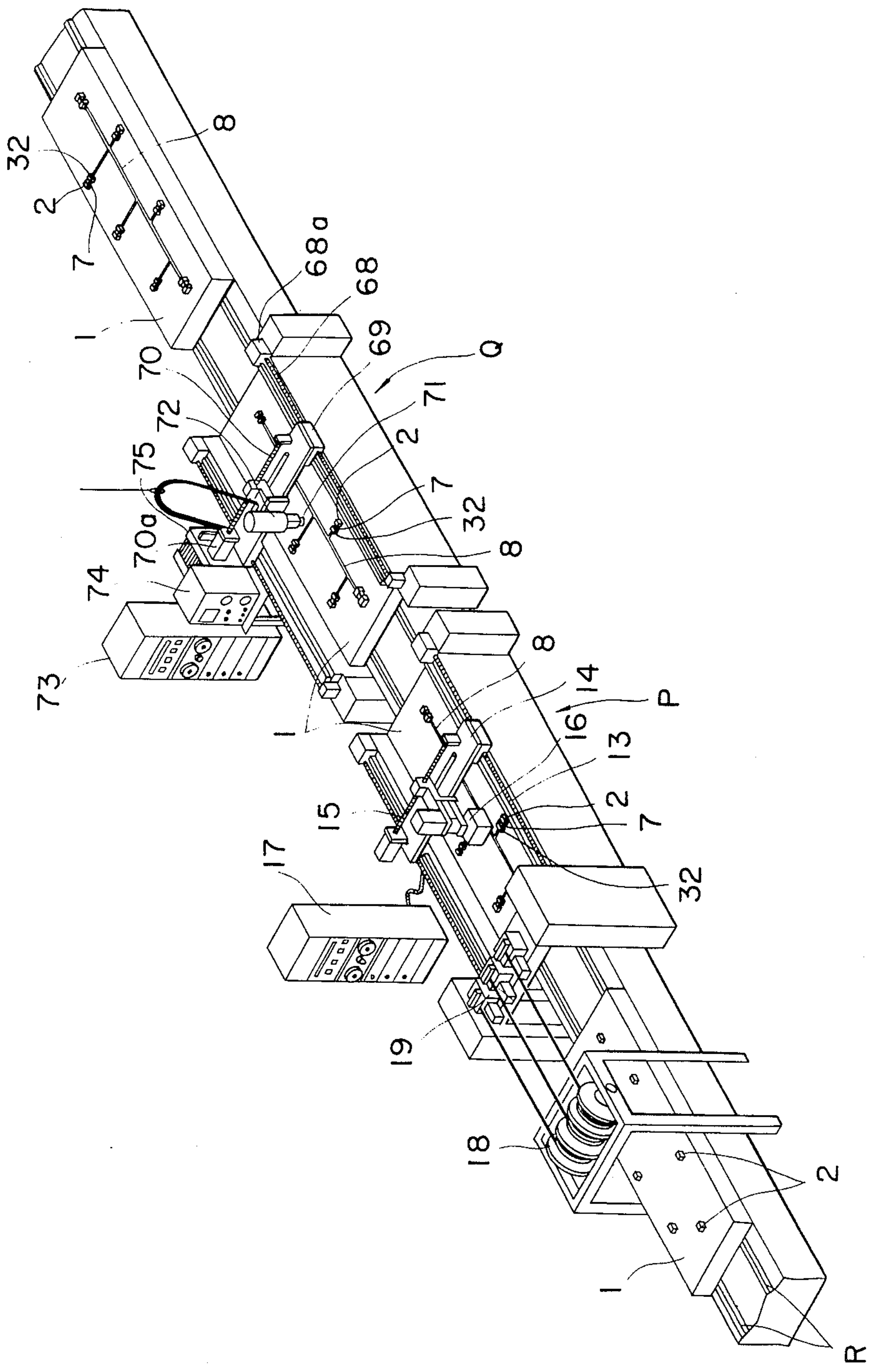
FIG. 32 is a perspective view of another manufacturing apparatus embodying the present invention.

FIG. 32 illustrates an embodiment in which the working stand 1 is arranged so that it can be moved on a guide rail R.

Wire-laying stands P and welding stands Q are alternately disposed on the guide rail R.

X shafts 13 are disposed on both the sides of the wire-laying stand P in the longitudinal direction thereof, and a Y shaft 15 is mounted on a supporting member 14 for moving the shaft 13. A wire-laying head 16 is movably mounted on the Y shaft 15. The X and Y shafts 13 and 15 are independently turned by different motors. By appropriately setting the rotation quantities of these motors, the head 16 and the wire held by the head 16 are shifted to an optional position on the working stand 1. Reference numeral 17 represents a control device which includes a tape for programming the wire-laying operation steps. Reference numerals 18 and 19 represent a reel station and a wire-cutting and coat-removing device, respectively.

Figure 33:
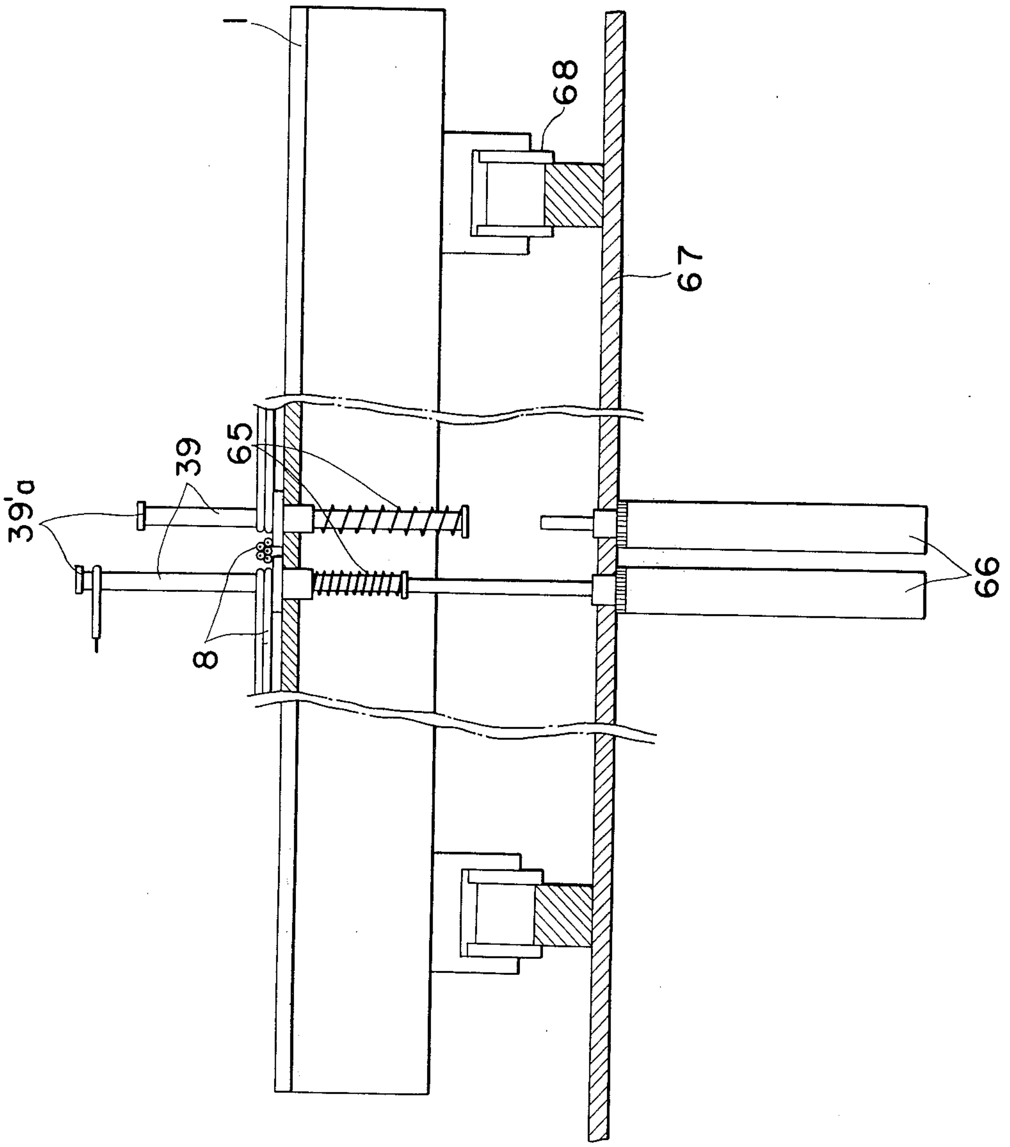
FIG. 33 is a detailed view of a branching pin for branching wires as shown in FIG. 32.

Referring now to FIG. 33, a branched wire-laying pin 39 having a wire-pressing head 39'*a* is vertically and movably mounted on the working stand 1, and the pin 39 is normally guided toward a lowered position by a coil spring 65. An actuator 66 for the pin 39 is spaced from the pin 39 and fixed to an attachment plate 67 on the wiring stand P so that when the working stand 1 is set at a prescribed position of the wire-laying stand P, it confronts the branched wire-laying pin 39. A roller 68 is mounted on the working stand 1.

X shafts 68 are disposed on both sides of the welding stand Q in the longitudinal direction thereof, and a Y shaft 70 is mounted on a supporting member 69 for moving the X shafts 68. A welding head 72 including an actuator for moving vertically an upper welding electrode 71 is movably mounted on the Y shaft 70. The X and Y shafts 68 and 70 are separately rotated by different pulse motors 68*a* and 70*a*. By appropriately setting the rotation quantities of these motors, the upper welding electrode is shifted to an optional position on the working stand 1.

Reference numeral 73 represents a control device including an NC tape programming the welding operation steps. Reference numerals 74, 75, and 76 represent a welding control device, a transformer for the welding operation, and a wire connected to the upper welding electrode, respectively.

Figure 34:
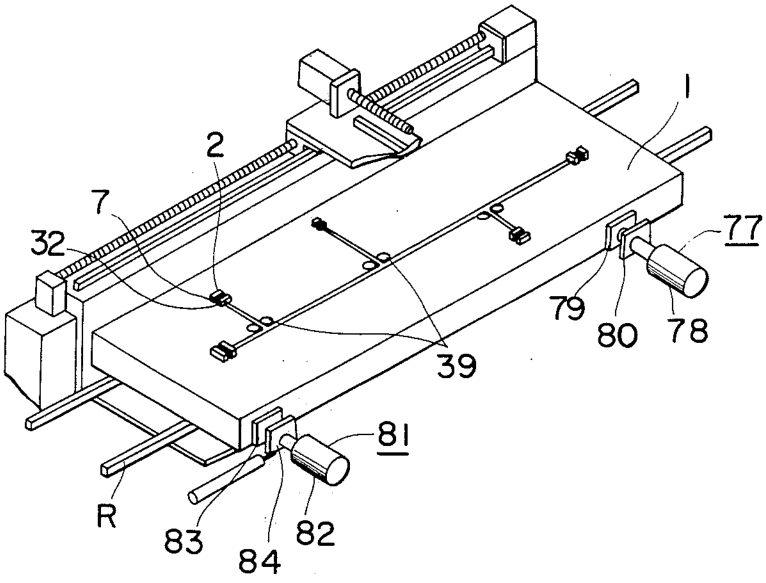
FIG. 34 is a detail view of a fixing member and an electricity applying member.

As shown in FIG. 34, a fixing member 77 for determining the position of the working stand 1 moving on the rail R is mounted on each of the wire-laying stand P and the welding stand Q. The fixing member 77 includes an actuator 78 to be actuated according to signals from detecting means such as a limit switch and an engaging fitting 80 which is advanced to or retreated from a receiving member 79 of the working stand 1 by the actuator 78.

A member 81 for applying electricity to the lower electrode of the working stand 1 is further mounted on the welding stand Q. This member 81 includes an actuator 82 to be actuated according to signals from detecting means such as a limit switch and a terminal 84 to be connected to a terminal 83 of the working stand 1 by the actuator 82.

The operation steps in the above embodiment will now be described.

The operation steps in this embodiment are roughly divided into (A) the preparation step, (B) the wire-laying step, (C) the welding step, and (D) the finishing step, according to the moving course of the working stand 1.

(A) Preparation Step

Connectors 2 are disposed on the working stand 1 at intervals corresponding to intervals in the product, and they are set so that the wire-connecting ends of the connectors 2 are held on the lower electrode 7.

(B) Wire-Laying Step (1) A wire of a necessary length is drawn out from the reel station 18 and set on the wire-cutting and coating-removing device 19, and it is fed to the original point of the machine (the origin of coordinates of the shafts X and Y).

(2) The working stand 1 moved from the preparation step is fixed to the wire-laying stand P by the positioning and fixing member 77, selection of the wire is performed according to the program of the control device 17, and the wire-laying head 16 is shifted to the prescribed position of the wire-cutting and coating-removing device 19.

(3) After confirmation of the setting of the wire-laying head 16 at the prescribed position, the device 19 is lifted up, and the wire is stretched between the wire guide and wire clamp in the head 16. These wire guide and wire clamp are closed after confirmation of the elevation of the device 19.

(4) The wire is clamped by the wire clamp, and then the wire-cutting and coating-removing device 19 is brought down.

(5) After confirmation of the lowering of the device 19, according to the program of the control device 17, a prescribed length of the wire is taken out by the X shaft with movement of the wire-laying head 16, and the wire length is measured.

(6) After the measurement, the wire-cutting and coating-removing device 19 is lifted up to effect cutting of the wire and removal of the coating.

(7) After the wire is cut and the coating is removed, the device 19 is brought down.

(8) According to the program of the control device 17, the wire-laying head 16 is shifted by the X and Y shafts, and the wire is shifted and set at such a position that the cut end of the wire is overlapped on the connection end of the connector 2.

(9) After the positioning of the wire, the wire clamp and wire-inserting ram disposed in the wire-laying head 16 are brought down, and the wire is inserted into and held by the wire clamping and supporting member.

(10) After completion of the insertion of the wire in the wire clamping and supporting member, the wire-clamping action of the head 16 is released, and the wire is lifted up. Simultaneously, the wire-inserting ram is lifted up.

(11) According to the program of the control device 17, the wire-laying head 16 is shifted by movements of the X and Y shafts, and the wire is laid out by the wire guide disposed in the head 16.

When the laying-out process is completed, a signal is emitted and the fixation by the positioning and fixing member 77 is released, and the working stand 1 is fed to the welding step.

(C) Welding Step (1) The working stand fed from the wire-laying step is fixed to the welding stand Q by the fixing member 77, and electricity is applied to the lower electrode through the electricity-applying member 81.

(2) According to the program of the control device 73, the actuator 72 for moving the upper electrode in the vertical direction is shifted to the exposed end of the wire on the lower electrode 7. After positioning of the actuator 72, the upper electrode 71 is brought down. In this manner, the welding operation is performed in succession.

(3) After completion of welding, the positioning member 77 and electricity applying member 81 are set free, and the working stand 1 is shifted to the finishing step.

(D) Finishing Step

In the semi-processed wire-harness on the working stand 1 fed from the welding step, a coating is molded on the welded portion of the wire and a gathering adhesive tape is applied.

The foregoing is considered illustrative only of the principles of the invention. Further, since numerous modifications and changes will readily occur among those skilled in the art, it is not desired to limit the invention to the exact construction and operation shown and described. Accordingly, all suitable modifications and equivalents may be resorted to, as long as they fall within the scope of the invention as claimed.

What is claimed is:

1. An apparatus for producing a wire-harness comprising a working stand, X and Y shafts mounted on the working stand to cross each other, said X and Y shafts being separately rotatable on the working stand, a wire-laying head connected to said X and Y shafts and movable above the working stand by said X and Y shafts, said wire-laying head comprising a wire-inserting ram, a wire clamp and a wire guide, a wire reel station disposed on one side of the working stand, a device for cutting a wire and removing an insulating coating from the cut end of the wire, a plurality of sets of wire clamping and supporting members, lower welding electrodes mounted on the working stand in close relation to each other, and upper welding electrodes movable toward and away from said lower welding electrodes, the wire-inserting ram being disposed on the lower end of a wire-treating member disposed in substantially parallel relation to the wire clamping and supporting members, longitudinal and lateral grooves in intersecting relation being formed on each wire clamping and supporting member, a wire-clamping rod being mounted on the wire-treating member to pierce the interior of the wire-treating member in a substantially vertical direction, a generally L-shaped wire-clamping pin being formed on the lower end of the wire-clamping rod, and the wire-clamping pin being rotatable and movable in a substantially vertical direction to cooperate with said intersecting grooves to effect clamping and guiding of the wire and gripping and disconnection of the wire.

2. An apparatus for producing a wire-harness as set forth in claim 1 where each wire clamping and supporting member contains therein a wire clamp arm, and said arm includes a pressing portion urged to the confronting wall through a fulcrum pin by a coil spring.

3. An apparatus for producing a wire-harness as set forth in claim 2 wherein said clamp arm comprises an escapement concave portion formed below said pressing portion, and sharp-edged vertical walls are formed to face the pressing portion.

4. An apparatus for producing a wire-harness as set forth in claim 1 wherein the lower welding electrodes are separated by a welding guide composed of a ceramic material.

5. An apparatus for producing a wire-harness as set forth in claim 4 wherein the welding guide composed of a ceramic material is raised with an inclination angle of 4° to 5°.

6. An apparatus for producing a wire-harness as set forth in claim 1 wherein the confronting welding surfaces of the upper and lower welding electrodes are shaped to have an arc-like concave portion extended in the wire direction, and arc-like corners are formed on both the ends of the axial direction of each concave portion.

7. An apparatus for producing a wire-harness as set forth in claim 1 which further comprises a branched wire-laying pin including a wire-pressing head which is advanced or retreated when the wire-laying head performs the branching operation.

8. An apparatus for producing a wire-harness as set forth in claim 1 wherein the working stand is constructed so that it can move along a prescribed path, wire-laying stands and welding stands are disposed alternately in succession along said path, a branched wire-laying pin having a wire-pressing head is vertically and movably mounted on the working stand so that said pin is urged to a lower position by a spring, and an actuator corresponding to said pin is formed on each of the wire-laying stands.

9. A process for producing a wire harness according to a predetermined program, comprising the steps of positioning a plurality of connectors with exposed connection ends on a working stand at respective predetermined positions adjacent to corresponding lower welding electrodes mounted on the working stand to hold the connection ends on the corresponding lower welding electrodes, picking up a laying wire with a stripped leading end from a reel station, pulling and advancing the laying wire to a prescribed length from the reel station straight along a longitudinal center route of the working stand, cutting the rear end of the laying wire and removing an insulating coating from the rear end thereof, guiding the leading end of the wire to one of preselected lower electrodes, overlapping and supporting the leading end of the wire at a position close to said one electrode, guiding the wire from said one electrode to another through the center route, and when at least one of the preselected lower electrodes is positioned at a branching point derived from the center route, supporting the wire by at least one pin extending upwardly at the branching point on the center route in the working stand, the pin being vertically movable to an upper position in which it supports the laying wire, overlapping and supporting the rear end of the wire on the connection end of the connector on the lower electrode, repeating the above-mentioned steps for laying successive laying wires on other lower electrodes, and thereafter moving upper welding electrodes down to the lower welding electrodes to weld all the overlapped ends of the connectors and the laying wires.

10. A process for producing a wire harness according to claim 9, wherein the preselected length of the laying wire to be cut is little longer than the actual connection distance between two connectors, and after confirming the rear end of the laying wire at the position near the other of the preselected electrodes, the exposed rear end of the laying wire is moved back to the position at which it is held on the lower electrode.

11. A process for producing a wire-harness according to claim 9 wherein a wire is connected in advance to each terminal fitting of the connector to form the respective exposed connection end, and the exposed cut end of the laying wire is welded to the connecting end of a terminal fitting.

12. A process for producing a wire-harness according to claim 9 wherein the exposed end of the laying wire is directly welded to the connecting end of a terminal fitting of the connector.

13. An apparatus for producing a wire-harness according to a predetermined program comprising a working stand, X and Y shafts mounted on the working stand to cross each other, said X and Y shafts being separately rotatable on the working stand, a wire-laying head connected to said X and Y shafts and movable above the working stand by said X and Y shafts, said wire-laying head comprising a wire-inserting ram, a wire clamp and a wire guide, a wire reel station disposed on one side of the working stand, a wire cutting device disposed close to the reel station for cutting a wire and removing an insulating coating from the cut end of the wire, a plurality of lower welding electrodes each mounted on the working stand in a predetermined position close to which each connector is arranged, a plurality of sets of wire clamping and supporting members each provided close to a corresponding lower electrode, a plurality of vertical guide pins for guiding and branching laying wires which are positioned on the working stand along the longitudinal center line of the working stand, each guide pin being vertically movable through a hole in the working stand between upper and lower positions, and upper welding electrodes movable toward and away from said lower welding electrodes.

14. An apparatus for producing a wire-harness according to claim 13, wherein each guide pin has a wire pressing head for pressing the wire by its downward movement of the pin.

15. An apparatus for producing a wire-harness according to claim 13, wherein the wire clamping and supporting member contains therein a wire clamp arm, and said arm includes a pressing portion urged to the confronting wall through a fulcrum pin by a coil spring.

16. An apparatus for producing a wire-harness according to claim 15, wherein the pressing portion is concave at the lower portion thereof to allow the lower one of the overlapped wires escape there.

17. An apparatus for producing a wire-harness according to claim 13, wherein the wire-inserting ram is disposed on the lower end of a wire-treating member adapted to be in substantially parallel relation to the wire clamping and supporting member, longitudinal and lateral grooves crossing each other substantially rectangularly are formed on the wire clamping and supporting member, a wire-clamping rod is mounted on the wire-treating member in a substantially vertical direction, a substantially L-shaped wire-clamping pin is formed on the lower end of said wire-clamping rod, and means are provided to rotate said wire-clamping pin and move it in the vertical direction to co-operate with said crossing grooves to effect clamping and guiding of the wire and catching and disconnection of the wire.

18. An apparatus for producing a wire-harness according to claim 13, wherein it comprises means for cutting the preselected length of the laying wire which length is slightly longer than the actual connection distance between two connectors, means for confirming the rear end of the laying wire, said rear end confirming means including a wire end detecting member having two opposed branches to be opened and closed, the wire end detecting member being disposed near the wire guide.

* * * * *